US012692741B2

(12) United States Patent
Matsunaga et al.

(10) Patent No.: US 12,692,741 B2
(45) Date of Patent: Jul. 28, 2026

(54) AUTOMATIC DOOR DEVICE FOR DETECTING OBJECT USING INFRARED SENSOR AND IMAGE SENSOR, AUTOMATIC DOOR SENSOR, AUTOMATIC DOOR CONTROL METHOD, STORAGE MEDIUM STORING AUTOMATIC DOOR CONTROL PROGRAM, AUTOMATIC DOOR SENSOR CONTROL METHOD, AND STORAGE MEDIUM STORING AUTOMATIC DOOR SENSOR CONTROL PROGRAM

(71) Applicant: NABTESCO CORPORATION, Tokyo (JP)

(72) Inventors: Junichi Matsunaga, Tokyo (JP); Shigeaki Sasaki, Tokyo (JP); Ryo Miyazaki, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 111 days.

(21) Appl. No.: 18/630,309

(22) Filed: Apr. 9, 2024

(65) Prior Publication Data

US 2024/0254824 A1 Aug. 1, 2024

Related U.S. Application Data

(63) Continuation of application No. PCT/JP2022/037580, filed on Oct. 7, 2022.

(30) Foreign Application Priority Data

| | | |
|---|---|---|
| Oct. 12, 2021 | (JP) | 2021-167515 |
| Oct. 12, 2021 | (JP) | 2021-167516 |

(51) Int. Cl.

| | |
|---|---|
| *G08B 21/00* | (2006.01) |
| *E05F 15/73* | (2015.01) |
| *G06T 7/90* | (2017.01) |

(52) U.S. Cl.
CPC ............... *E05F 15/73* (2015.01); *G06T 7/90* (2017.01); *E05F 2015/765* (2015.01); *E05F 2015/767* (2015.01); *G06T 2207/30196* (2013.01)

(58) Field of Classification Search
CPC ............... E05F 15/73; E05F 2015/765; E05F 2015/767; E05F 15/74; G06T 7/90; G06T 2207/30196; G01V 8/10; G01V 8/20
(Continued)

(56) References Cited

U.S. PATENT DOCUMENTS

| | | | | |
|---|---|---|---|---|
| 2005/0105778 A1* | 5/2005 | Sung | .................... | G06V 40/166 |
| | | | | 382/218 |
| 2007/0094932 A1* | 5/2007 | Hoshide | .................. | E05F 15/73 |
| | | | | 49/118 |

FOREIGN PATENT DOCUMENTS

| | | | | | |
|---|---|---|---|---|---|
| GB | 2562251 | A | * 11/2018 | ............. | H04N 7/183 |
| JP | H08149455 | A | 6/1996 | | |
| JP | 2000331252 | A | * 11/2000 | | |
| JP | 2003270354 | A | 9/2003 | | |
| JP | 2005090089 | A | 4/2005 | | |
| JP | 2006225874 | A | * 8/2006 | | |

(Continued)

OTHER PUBLICATIONS

JP Office Action from JP Application No. 2023-554491 mailed Feb. 4, 2025, 10 pages.

(Continued)

*Primary Examiner* — Mark S Rushing
(74) *Attorney, Agent, or Firm* — Shih IP Law Group, PLLC

(57) ABSTRACT

An automatic door device includes an infrared sensor, an image sensor, an infrared detection determiner, an image detection determiner, a determiner, and a control unit. The infrared sensor detects a person or an object in an infrared detection area. The image sensor detects a person or an object in an image detection area. The infrared detection determiner determines whether a person or an object is (Continued)

detected by the infrared sensor. The image detection determiner determines whether a person or an object is detected by the image sensor. The determiner determines whether to perform an opening operation of the door based on each determination result of the infrared detection determiner and the image detection determiner. The control unit causes the door to perform the opening operation based on a determination result indicating that the opening operation is performed.

25 Claims, 22 Drawing Sheets

(58) Field of Classification Search
USPC ....................................................... 340/545.1
See application file for complete search history.

(56) References Cited

FOREIGN PATENT DOCUMENTS

| JP | 2009157763 A | | 7/2009 |
|----|--------------|---|--------|
| JP | 2013206166 A | * | 10/2013 |
| JP | 2014157098 A | * | 8/2014 |
| JP | 2015017990 A | | 1/2015 |

OTHER PUBLICATIONS

International Search Report for International Application No. PCT/JP2022/037580; Date of Mailing, Dec. 20, 2022.
PCT International Preliminary Report on Patentability with Written Opinion of International Search Authority for International Application No. PCT/JP2022/037580; Date of Mailing, Dec. 20, 2022.

* cited by examiner

AUTOMATIC DOOR DEVICE FOR DETECTING OBJECT USING INFRARED SENSOR AND IMAGE SENSOR, AUTOMATIC DOOR SENSOR, AUTOMATIC DOOR CONTROL METHOD, STORAGE MEDIUM STORING AUTOMATIC DOOR CONTROL PROGRAM, AUTOMATIC DOOR SENSOR CONTROL METHOD, AND STORAGE MEDIUM STORING AUTOMATIC DOOR SENSOR CONTROL PROGRAM

CROSS REFERENCE TO RELATED APPLICATIONS

This application is a continuation under 35 U.S.C. § 120 of PCT/JP2022/037580, filed Oct. 7, 2022, which is incorporated herein by reference, and which claimed priority to Japanese Application No. 2021-167515, filed Oct. 12, 2021, and Japanese Application No. 2021-167516, filed Oct. 12, 2021. The present application likewise claims priority under 35 U.S.C. § 119 to Japanese Application No. 2021-167515, filed Oct. 12, 2021, and Japanese Application No. 2021-167516, filed Oct. 12, 2021, the entire content of which are also incorporated herein by reference.

TECHNICAL FIELD

The present invention relates to an automatic door device for detecting an object using an infrared sensor and an image sensor, an automatic door sensor, an automatic door control method, a storage medium storing an automatic door control program, an automatic door sensor control method, and a storage medium storing an automatic door sensor control program.

BACKGROUND ART

In an automatic door, there is known a technique of detecting a person or an object by projecting and receiving light from an infrared sensor in a detection area near the automatic door (see, for example, Patent Literature 1).

PRIOR ART LITERATURE

Patent Literature

Patent Literature 1: JP 2015-17990 A

SUMMARY OF INVENTION

As a result of uniquely studying an automatic door that detects a person or an object by projecting and receiving light from the infrared sensor as described above, the present inventor has recognized the following problems. In other words, since a detection area of the infrared sensor is relatively narrow, a timing at which a sensing result of the infrared sensor is obtained is likely to be delayed, and a timing at which it is determined to open the door is likely to be delayed. As a result, there is a problem that a passerby needs to decelerate or stop in front of the door, which causes stress to the passerby.

On the other hand, for the automatic door, it is assumed that a person or an object is detected using an image sensor having a detection area relatively wider than that of the infrared sensor. However, in the image sensor, in a case where an object that is difficult to determine whether it is a person or an object (for example, a shadow of a person due to back light) approaches, there is a problem that erroneous detection may occur even though there is no passerby trying to pass through the automatic door, and wasteful opening occurs.

In view of the above, an object of the present invention is to provide a technique capable of determining whether or not to open a door at a timing earlier than a case of using a single infrared sensor, and capable of reliably determining whether or not a person or an object is detected as compared with a case of using a single image sensor.

Solution to Problem

In order to solve the above problem, an automatic door device according to an aspect of the present invention includes: an infrared sensor including an infrared detection area around a door provided in an opening and that detects a person or an object in the infrared detection area; an image sensor including an image detection area around the door and that detects a person or an object in the image detection area; an infrared detection determiner that determines whether the infrared sensor detects a person or an object; an image detection determiner that determines whether the image sensor detects a person or an object; a determiner that determines whether or not to perform an opening operation of the door based on respective determination results of the infrared detection determiner and the image detection determiner; and a controller that performs the opening operation of the door based on a determination result indicating that the opening operation is to be performed.

An automatic door sensor according to an aspect of the present invention includes: an infrared sensor including an infrared detection area around a door provided in an opening and that detects a person or an object in the infrared detection area; an image sensor including an image detection area around the door and that detects a person or an object in the image detection area; an infrared detection determiner that determines whether the infrared sensor detects a person or an object; an image detection determiner that determines whether the image sensor detects a person or an object; and a sending determiner that determines whether or not to transmit an opening operation signal for causing the door to perform an opening operation based on each determination result of the infrared detection determiner and the image detection determiner.

An automatic door control method according to one aspect of the present invention includes: a step of acquiring infrared data from an infrared sensor including an infrared detection area around a door provided in an opening and that detects a person or an object in the infrared detection area; a step of acquiring image data from an image sensor including an image detection area around the door and that detects a person or an object in the image detection area; a step of determining whether the infrared sensor detects a person or an object based on the infrared data; a step of determining whether the image sensor detects a person or an object based on the image data; a step of determining whether or not to perform an opening operation of the door based on respective determination results as to whether the infrared sensor and the image sensor detect a person or an object, and a step of causing the door to perform an opening operation based on a determination result indicating that the opening operation is to be performed.

A storage medium according to an aspect of the present invention is structured to cause a computer to perform an automatic door control program, the program including: a step of acquiring infrared data from an infrared sensor including an infrared detection area around a door provided in an opening and that detects a person or an object in the infrared detection area; a step of acquiring image data from an image sensor including an image detection area around the door and that detects a person or an object in the image detection area; a step of determining whether the infrared sensor detects a person or an object based on the infrared data; a step of determining whether the image sensor detects a person or an object based on the image data; a step of determining whether or not to perform an opening operation of the door based on respective determination results as to whether the infrared sensor and the image sensor detect a person or an object, and a step of causing the door to perform an opening operation based on a determination result indicating that the opening operation is to be performed.

An automatic door control method according to an aspect of the present invention includes: a step of outputting infrared data from an infrared sensor including an infrared detection area around a door provided in an opening; a step of outputting image data from an image sensor including an image detection area around the door; and a step of determining whether or not to transmit an opening operation signal for causing the door to perform an opening operation based on the infrared data and the image data for an area in which the infrared detection area and the image detection area overlap.

A storage medium according to an aspect of the present invention stores an automatic door sensor control program for causing a computer to execute: a step of outputting infrared data from an infrared sensor including an infrared detection area around a door provided in an opening; a step of outputting image data from an image sensor including an image detection area around the door; and a step of determining whether or not to transmit an opening operation signal for causing the door to perform an opening operation based on the infrared data and the image data for an area in which the infrared detection area and the image detection area overlap.

Note that any combinations of the above components and modifications of the expressions of the present invention in methods, apparatuses, systems, recording media, computer programs, and the like are also effective as aspects of the present invention.

DESCRIPTION OF EMBODIMENTS

First Embodiment

Figure 1:
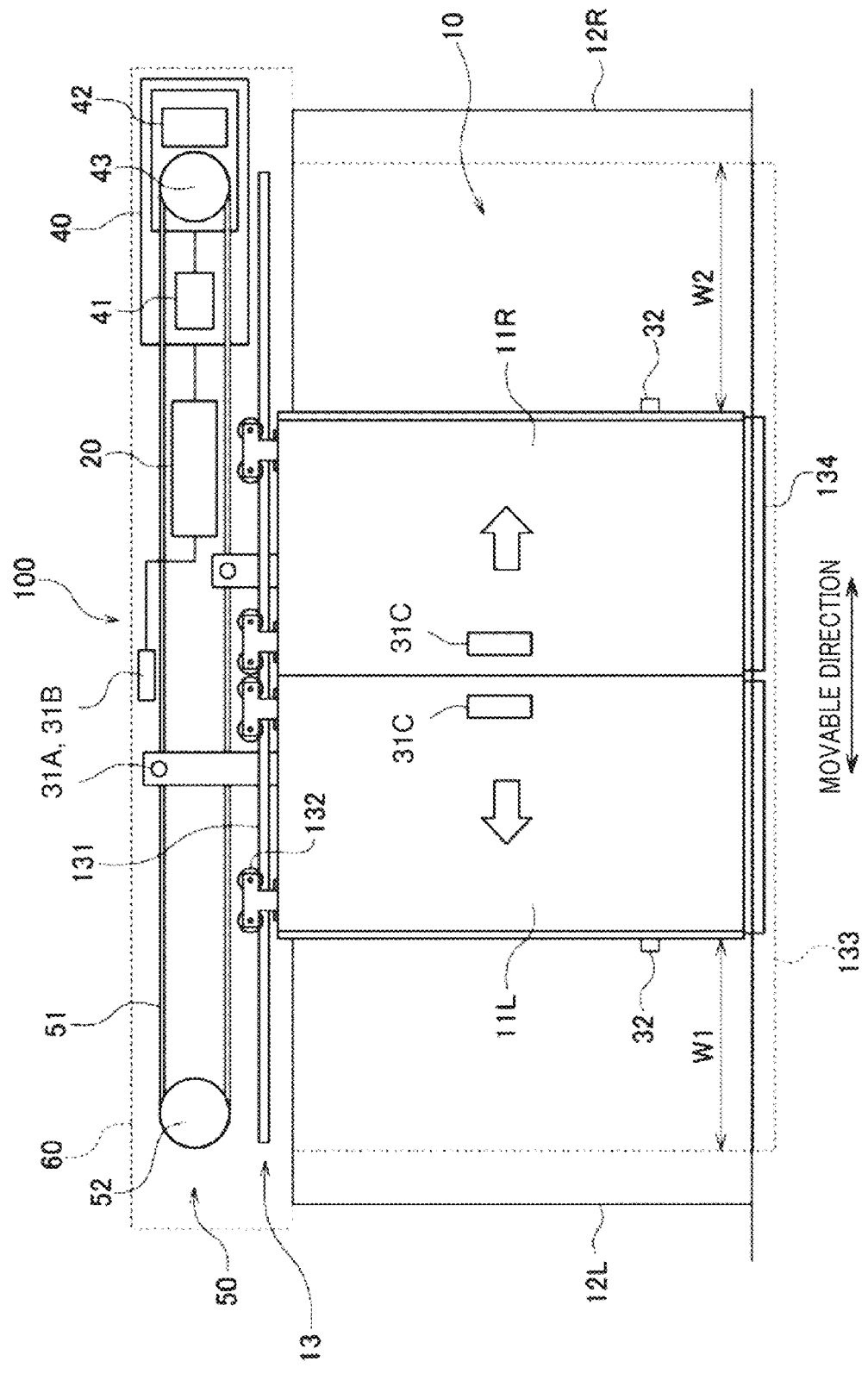
FIG. 1 is a front view schematically illustrating an automatic door.

An outline of an automatic door 100 according to the first embodiment will be described with reference to FIG. 1 and FIG. 2. FIG. 1 is a front view schematically illustrating the automatic door 100 of the present embodiment. The automatic door 100 mainly includes a door part 10 which is driven to open and close, a controller 20 which controls the entire automatic door 100, a door sensor 30 which detects a passer, a door engine 40 which generates power, and a power transmission unit 50 which transmits power to the door part 10. The automatic door 100 of the present embodiment is an example of an automatic door device. Note that in the following description, a left-right direction in FIG. 1 is a horizontal direction (an opening/closing direction of an automatic door), an up-down direction in FIG. 1 is a vertical direction, and a direction orthogonal to the left-right direction and the up-down direction in FIG. 1 is a depth direction. However, the automatic door 100 can be installed in any orientation, and the installation direction is not limited to the following example.

The door part 10 includes a first movable door 11L and a second movable door 11R that are movable in the horizontal direction, a first fixed door 12L and a second fixed door 12R that are provided at positions overlapping with the first movable door 11L and the second movable door 11R when the first movable door 11L and the second movable door 11R are in an open state, and a guide mechanism 13 that guides the horizontal operation of the first movable door 11L and the second movable door 11R. The first movable door 11L, the second movable door 11R, the first fixed door 12L, and the second fixed door 12R are formed in a vertically long rectangular shape whose dimensions in the vertical direction are larger than the dimensions in the horizontal direction. When the door part 10 is driven to open, the first movable door 11L illustrated on the left side in FIG. 1 is driven leftward, and the second movable door 11R illustrated on the right side in FIG. 1 is driven to the right. When the door part 10 is driven to close, contrary to being driven to open, the first movable door 11L is driven rightward, and the second movable door 11R is driven leftward. Note that the number and the shape of the doors constituting the door part 10 are not limited to the above, and can be appropriately designed according to needs of the installation location. Similarly, the movable direction of the door part 10 is not limited to the horizontal direction and may be a direction inclined from the horizontal direction.

The guide mechanism 13 includes a traveling rail 131, a door roller 132, a guide rail 133, and a steady rest 134. The traveling rail 131 is a columnar rail member extending in the horizontal direction over the entire movable range above the movable doors 11L and 11R. Two door rollers 132 are provided above the movable doors 11L and 11R, respectively, and suspend the movable doors 11L and 11R to the traveling rail 131. When the movable doors 11L and 11R are driven to open and close in the horizontal direction, the door rollers 132 roll on the traveling rail 131, so that a smooth opening and closing operation can be performed. The guide rail 133 is a groove-shaped rail member extending in the horizontal direction over the entire movable range below the movable doors 11L and 11R. The steady rest 134 projects from lower portions of the movable doors 11L and 11R and is accommodated in the groove-shaped guide rail 133. When the movable doors 11L and 11R are driven to open and close in the horizontal direction, the steady rest 134 moves along the guide rail 133, so that vibration of the movable doors 11L and 11R in the depth direction can be suppressed.

The controller 20 can set various parameters related to opening and closing of the door part 10. For example, the controller 20 can adjust set values such as an opening/closing speed, an opening/closing strength, and an opening width. The opening/closing speed is a speed in the horizontal direction of the first movable door 11L and the second movable door 11R, and directions of speeds of the doors are opposite to each other. The opening/closing speed may be set to different values during normal opening/closing and at other times. For example, during normal closing drive of the door part 10, in a case of so-called reversal of switching to an opening drive for emergency avoidance of a passerby being caught by the first and second movable doors 11L and 11R to be closed, the speed of the first and second movable doors 11L and 11R during the opening drive may be set to a value different from the speed during a normal opening drive.

The opening/closing strength is a magnitude of a force when the movable doors 11L and 11R are opened and closed and is controlled by a torque value generated by a motor 42 to be described later. Similarly to the opening/closing speed described above, basically, it is preferable that the opening/closing strengths of the movable doors 11L and 11R are equal. Different opening and closing strengths may be set during normal opening and closing and at other times. The opening width is an interval in the horizontal direction between the first movable door 11L and the second movable door 11R when the door part 10 is fully opened. As illustrated in FIG. 1, when a moving distance between a fully closed position and a fully open position of the first movable door 11L is W1, and a moving distance between a fully closed position and a fully open position of the second movable door 11R is W2, the opening width is represented by W1+W2.

Figure 2:
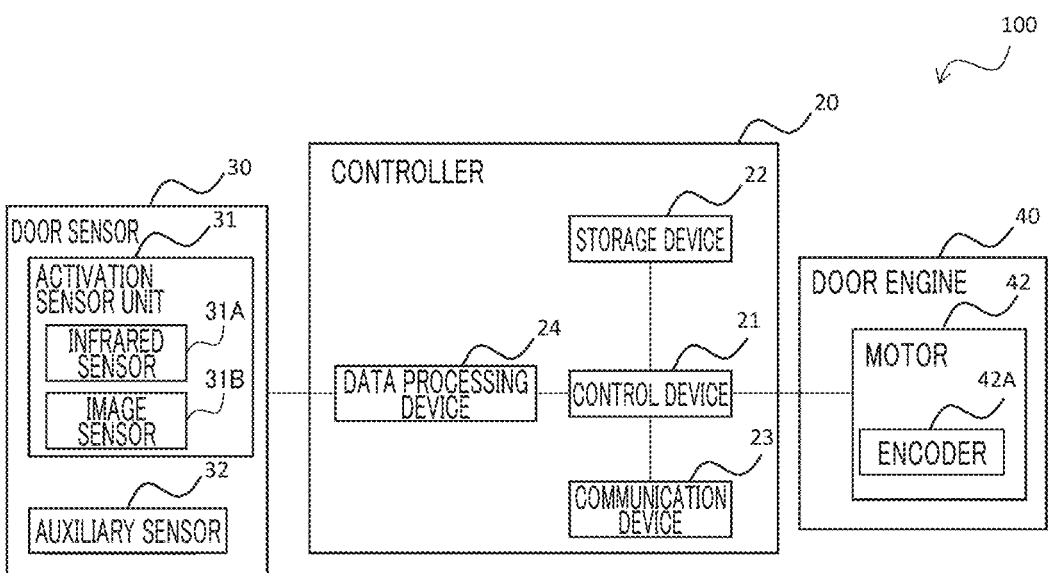
FIG. 2 is a diagram schematically illustrating various constituent devices of an automatic door.

Reference is made to FIG. 2. FIG. 2 is a block diagram schematically illustrating functions of the automatic door 100. Each functional block illustrated in each of the following drawings is realized by a computer having a calculation function, a control function, a storage function, an input function, and an output function in terms of hardware, various electronic elements, mechanical parts, and the like, and is realized by a computer program or the like in terms of software. Here, functional blocks realized by cooperation of these are drawn. Therefore, it is to be understood by those skilled in the art that these functional blocks can be implemented in various forms by a combination of hardware and software.

The controller 20 includes a control device 21, a storage device 22, a communication device 23, and a data processing device 24. The control device 21 is implemented by an arithmetic processing device mounted on a microcontroller, and manages various kinds of information processing and control in the automatic door 100. The control device 21 controls the door engine 40 based on the detection result of the door sensor 30 to open and close the door part 10. The control device 21 can open and close the automatic door 100 in response to receiving an open/close command signal for opening and closing the automatic door 100 from a work terminal of a worker or a remote computer via the communication device 23.

The storage device 22 is a general-purpose memory that stores various data of the automatic door 100.

The communication device 23 exchanges various types of information with a communication device outside the automatic door 100 by wired or wireless connection. For example, the communication device 23 can communicate with a work terminal used by a worker who goes to a site for installation or maintenance and inspection of the automatic door 100. Accordingly, the worker can confirm information of each part of the automatic door 100 on the work terminal and can input various data of the automatic door 100. In a case where the communication device 23 has a communication function via a public information communication network such as the Internet, information confirmation and data input of the automatic door 100 can be performed from a remote computer.

The data processing device 24 processes the infrared data of an infrared sensor 31A and the image data of an image sensor 31B in an activation sensor unit 31 to be described later and transmits the processing result to the control device 21.

Reference is made again to FIG. 1. The door sensor 30 includes the activation sensor unit 31 for activating the automatic door 100 and an auxiliary sensor 32. The activation sensor unit 31 includes an infrared sensor 31A for detecting a person or an object in an infrared detection area 71 (to be described later) defined in the automatic door 100, and an image sensor 31B for detecting a person or an object in an image detection area 73 (to be described later) defined in the automatic door 100. The activation sensor unit 31 is provided on each of an indoor side (for example, a front side of a paper surface of FIG. 1) and an outdoor side (for example, a back side of the paper surface of FIG. 1) and can detect a passerby approaching from either side.

The infrared sensor 31A is disposed on a surface of a muntin 60 above the door part 10. The infrared sensor 31A includes a light projector that projects infrared light toward a floor surface and a light receiver that receives reflected light from the floor surface. The infrared sensor 31A transmits the light reception amount of the light received and projected by the light projector near the opening of the automatic door 100 to the data processing device 24 as the infrared data. When a person or an object such as a passerby or a passer approaches the automatic door 100 and blocks light, the light reception amount of the light receiver changes. Therefore, a person or an object is detected based on a change in the light reception amount. In a case where a person or an object is detected based on the amount of light received by the infrared sensor 31A, the controller 20 drives the door engine 40 to open the door part 10. The infrared detection area 71 (see FIG. 3), which is a detection area of the infrared sensor 31A, is set based on, for example, an installation location, an arrangement and types of the light projector and the light receiver, and a light projecting/receiving direction thereof.

The image sensor 31B is, for example, an imaging device such as a CMOS, a CCD, and a time-of-flight (TOF) type camera. The image sensor 31B is disposed, for example, on the surface of the muntin 60 above the door part 10 and captures an image of the front side of the automatic door 100 with an obliquely lower side from an arrangement position as an optical axis direction. The image sensor 31B acquires an image of a person or an object entering the automatic door 100 including a background in real time and transmits the acquired image data near the opening to the data processing device 24. The data processing device 24 performs image recognition of a person or an object based on the image data. In a case where a person or an object is detected based on the image data obtained by the image sensor 31B, the controller 20 drives the door engine 40 to open the door part 10. The image detection area 73 (see FIG. 3), which is a detection area of the image sensor 31B, is set based on an installation location, an imaging direction, and an angle of view thereof.

As illustrated in FIG. 1, the activation sensor unit 31 may include a touch plate 31C provided on at least one of the movable doors 11L and 11R, and the door part 10 may be driven by the touch plate 31C being pressed by a passerby. In a tourist facility, an amusement park, or the like, an aspect is also assumed in which the door part 10 is driven by an operation of a staff of the facility in addition to or instead of detection and operation of a passerby. At this time, the staff of the facility can remotely drive the door part 10 using an operation panel provided at a position away from the door part 10 or an operation terminal capable of communicating with the automatic door 100.

The auxiliary sensor 32 is a photoelectric sensor provided on the first fixed door 12L and the second fixed door 12R of the door part 10. The auxiliary sensor 32 includes a light projector provided on one of the first fixed door 12L and the second fixed door 12R, and a light receiver provided on the other. The light projector and the light receiver are provided at the same height from the floor surface, and the light receiver receives light such as infrared rays projected in the horizontal direction from the light projector. When a passerby passes through the opening and blocks light in a state where the door part 10 is open, the light reception amount of the light receiver changes, so that the passerby can be detected. A main purpose of the auxiliary sensor 32 is to prevent a passerby from being caught by the closing door (a closing protection), and when the auxiliary sensor 32 detects the passerby during the closing operation of the movable doors 11L and 11R, the controller 20 performs a reverse control to stop the closing drive and switch to the opening drive. Accordingly, it is possible to prevent a passerby from being caught by the movable doors 11L and 11R to be closed.

Note that the auxiliary sensor 32 may be that detects a passerby by reflection of radio waves such as microwaves or ultrasonic waves. The auxiliary sensor 32 may be provided at a location different from the fixed doors 12L and 12R. For example, the auxiliary sensor 32 may be provided on the muntin 60 or may be installed on a ceiling near the automatic door 100. Providing a plurality of such auxiliary sensors 32 increases costs, but dramatically increases safety.

The door engine 40 includes a motor drive unit 41, a motor 42, and a driving pulley 43. The motor drive unit 41 includes an intelligent power module (IPM) and generates voltage or current for driving the motor 42 under the control of the controller 20. The motor 42 as a power source for generating rotational power can be configured as various known motors, but in the present embodiment, as an example, a brushless motor including an encoder 42A using a Hall element is used. The position of a rotor of the motor 42 detected by the encoder is input to the motor drive unit 41, and a driving voltage or a driving current corresponding thereto is applied to the motor 42, whereby desired rotational power is generated. The driving pulley 43 rotationally driven by the motor 42 is coupled to the rotor of the motor 42 via a gear mechanism (not illustrated) or the like and rotates in conjunction therewith.

The power transmission unit 50 transmits power generated by the door engine 40 to the door part 10 to drive the movable doors 11L and 11R to open and close. The power transmission unit 50 includes a power transmission belt 51, a driven pulley 52, and a coupling member 53. The power transmission belt 51 is an annular timing belt having a large number of teeth formed on an inner peripheral surface and is wound around the driving pulley 43 on the right side of FIG. 1 and wound around the driven pulley 52 on the left side of FIG. 1. In this state, dimensions in the horizontal direction of the power transmission belt 51 is equal to a distance in the horizontal direction between the driving pulley 43 and the driven pulley 52 and is substantially equal to the dimensions in the horizontal direction of a movable range of the movable doors 11L and 11R. When the driving pulley 43 is rotated by the motor 42, the driven pulley 52 is rotated in conjunction via the power transmission belt 51.

The coupling member 53 couples the movable doors 11L and 11R to the power transmission belt 51 to open and close. Here, one movable door is connected to an upper side of the power transmission belt 51, and the other movable door is connected to a lower side of the power transmission belt 51. In the example of FIG. 1, when the power transmission belt 51 rotates counterclockwise, the opening operation is performed such that the first movable door 11L moves to the left side and the second movable door 11R moves to the right side. When the power transmission belt 51 rotates clockwise, the closing operation is performed such that the first movable door 11L moves to the right side and the second movable door 11R moves to the left side.

In the automatic door 100 configured as described above, when a passerby is detected based on the detection result of the door sensor 30, the door engine 40 generates rotational power in a counterclockwise direction to drive the door part 10 to open under the control of the controller 20 in a case where predetermined sensing conditions are satisfied. In a case where a state in which a passerby is not detected continues for a predetermined time of period after the opening drive, the door engine 40 generates rotational power in a clockwise direction to drive the door part 10 to close under the control of the controller 20. Note that when the door sensor 30 detects a passerby during the closing drive, the controller 20 performs the reverse control for switching from the closing drive to the opening drive.

Figure 3:
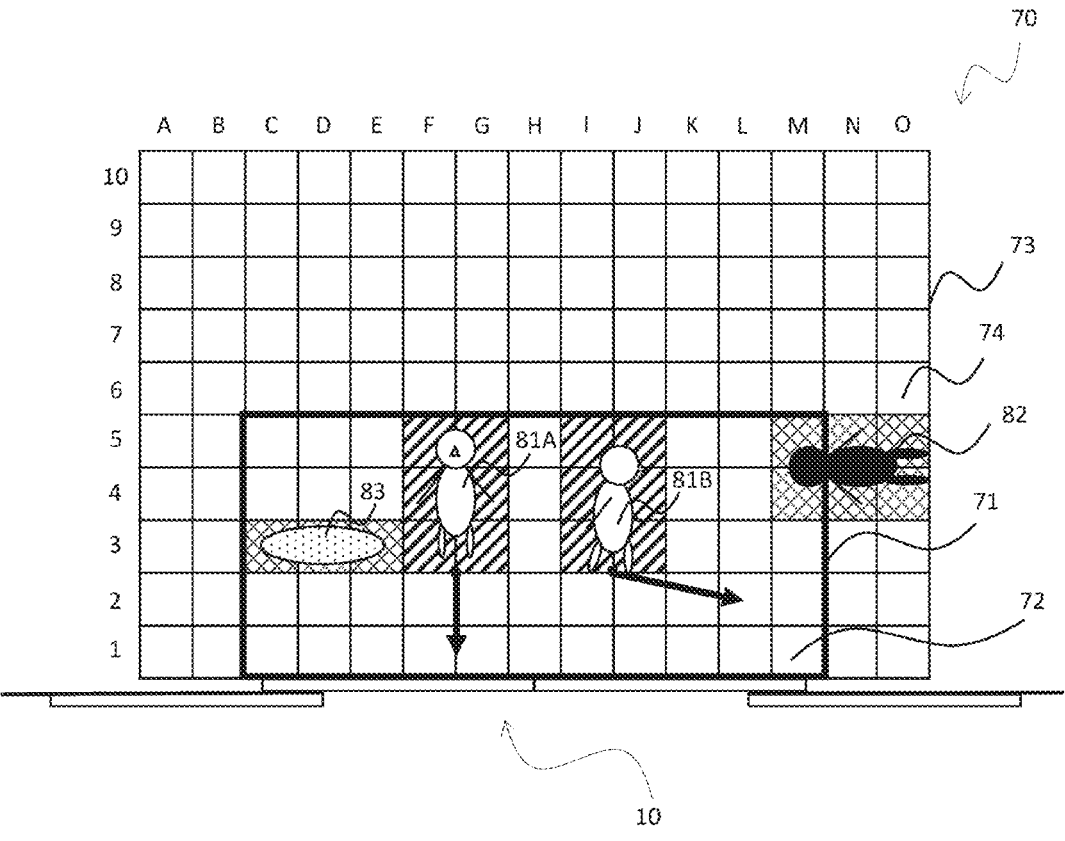
FIG. 3 is a diagram schematically illustrating a detection area of a sensor.

FIG. 3 is a schematic diagram illustrating the detection area of the infrared sensor 31A and the image sensor 31B. The detection area 70 has a three-dimensional range from the floor surface to the muntin 60 where the activation sensor unit 31 is disposed and the ceiling. The detection area 70 in FIG. 3 represents only the floor surface for simplification. The detection area 70 includes the infrared detection area 71 that is a detection area of the infrared sensor 31A, and the image detection area 73 that is a detection area of the image sensor 31B. In the present embodiment, the entire infrared detection area 71 is superimposed on a part of the image detection area 73.

The infrared detection area 71 in FIG. 3 includes a plurality of infrared detection spots 72 arranged in 11 rows in a direction parallel to the opening and closing direction of the automatic door 100 and arranged in 5 rows in the depth direction. Addresses 1C, 1D, . . . , 5L, and 5M corresponding to positions of the array are assigned to each infrared detection spot 72. Each assigned address corresponds to position information of each infrared detection spot 72. The shape of each infrared detection spot 72 and the shape of the entire infrared detection area 71 may be a circle, an ellipse, a rectangle, or a polygon other than a rectangle. The shape of the infrared detection spot 72 varies depending on the installation location, the arrangement and types of the light projector and the light receiver, the light projecting/receiving direction, and the like.

The image detection area 73 in FIG. 3 includes a plurality of image detection spots 74 arranged in 15 rows in a direction parallel to the opening/closing direction of the automatic door 100 and arranged in 10 rows in the depth direction. Addresses 1A, 1B, . . . , 10N, and 100 corresponding to the positions of the array are assigned to the image detection spots 74. Each assigned address corresponds to position information of each image detection spot 74. The shape of the image detection spots 74 of the present embodiment is set to match the shape of the infrared detection spots 72. The shape of the image detection spots 74 varies depending on the installation location, the imaging direction, the angle of view, and the like.

Hereinafter, the infrared detection spots 72 and the image detection spots 74 may be collectively referred to as detection spots. Assignment of various numbers to the detection spots described above is merely an example, and other modes may be used. The number of detection spots in the detection area 70 is arbitrary, and the detection spots in the detection area 70 are not limited to a matrix shape or a lattice shape and can be divided into any shape.

Figure 4:
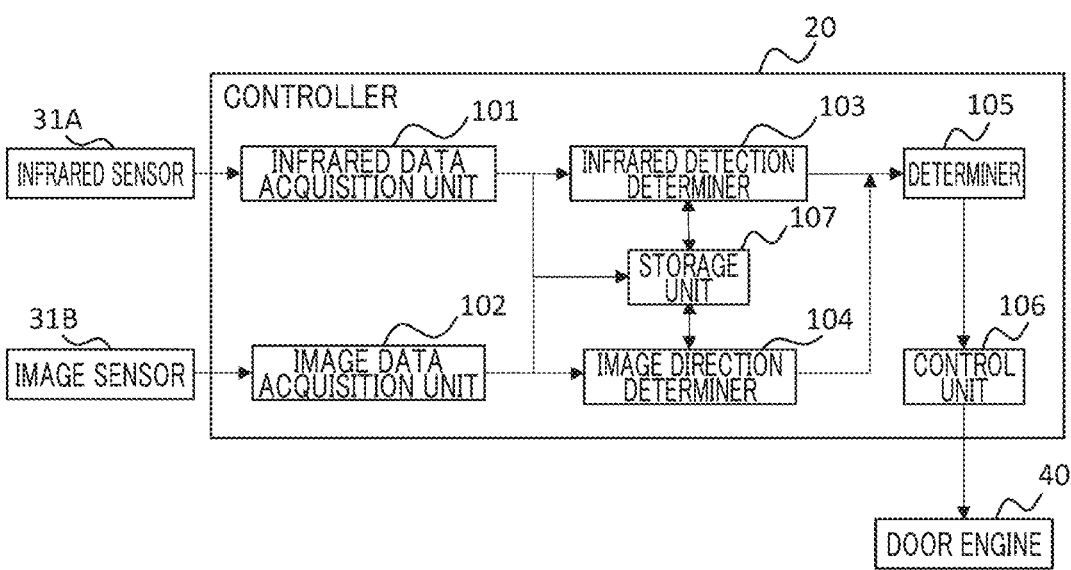
FIG. 4 is a functional block diagram of an automatic door according to a first embodiment.

FIG. 4 is a functional block diagram of the controller 20 according to the present embodiment. The controller 20 includes an infrared data acquisition unit 101, an image data acquisition unit 102, an infrared detection determiner 103, an image detection determiner 104, a determiner 105, a control unit 106, and a storage unit 107.

The infrared data acquisition unit 101 acquires the infrared data supplied from the infrared sensor 31A. The image data acquisition unit 102 acquires the image data supplied from the image sensor 31B. The infrared detection determiner 103 determines whether a person or an object is detected by the infrared sensor 31A. The image detection determiner 104 determines whether a person or an object is detected by the image sensor 31B.

The determiner 105 determines whether or not to perform the opening operation of the movable door 11 of the automatic door 100 based on respective determination results of the infrared detection determiner 103 and the image detection determiner 104. The control unit 106 causes the movable door 11 to perform the opening operation based on the determination result to perform the opening operation by the determiner 105.

The storage unit 107 stores various data of the automatic door 100. For example, the storage unit 107 stores a reference light reception amount for each infrared detection spot 72 of the light reception amount of the light reflected by each infrared detection spot 72 and received by the infrared sensor 31A and a reference image of the image detection area 73. The reference light reception amount for each of the infrared detection spots 72 and the reference image of the image detection area 73 may be generated by machine learning of the reference light reception amount for each of the infrared detection spots 72 and the image of the image detection area 73 from time-series data of the infrared data and the image data in a case where there is no detection target in the detection area 70, or a predetermined one may be used. The storage unit 107 stores various threshold values. Moreover, the storage unit 107 stores the infrared data and the image data in time series.

Figure 5:
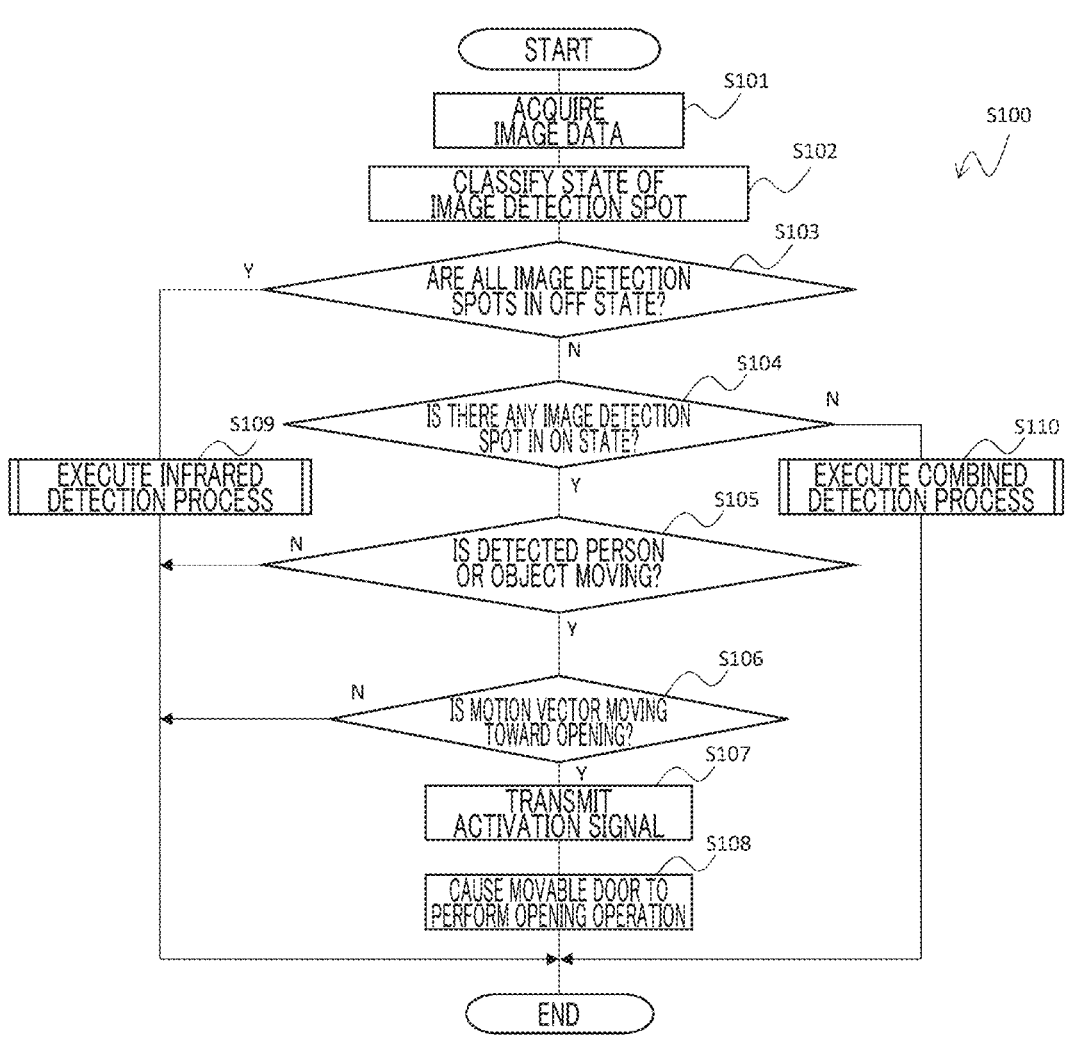
FIG. 5 is a flowchart of a detection process of the automatic door according to the first embodiment.

The processing of the controller 20 according to the present embodiment will be described with reference to FIG. 5. FIG. 5 is a flowchart illustrating a detection process S100 of a person or an object in the controller 20 according to the present embodiment. The detection process S100 is executed at predetermined time intervals.

In step S101, the image data acquisition unit 102 acquires the image data from the image sensor 31B. The image data acquisition unit 102 supplies the acquired image data to the image detection determiner 104.

In step S102, the image detection determiner 104 classifies the state of each image detection spot 74 into any of an ON state, a temporary ON state, and an OFF state based on the image data. Here, the ON state is a state in which it is determined that a person or an object is present in the detection spot, the temporary ON state is a state in which the determination as to whether a person or an object is present in the detection spot is suspended, and the OFF state is a state in which it is determined that a person or an object is not present in the detection spot.

The ON state, the temporary ON state, and the OFF state will be described with reference to FIG. 3. For example, in a case where persons 81A and 81B are present in the image detection area 73, the image data of the corresponding image detection spot 74 (for example, the image detection spot 74 to which the addresses 3F to 5F, 3G to 5G, and the addresses 3I to 5I and 3J to 5J are assigned) is clearly different from the reference image depending on the presence or absence of the persons 81A and 81B. As a result, these corresponding image detection spots 74 are classified into the ON state. For example, in a case where there is a human shadow 82 in the image detection area 73, the image data of the corresponding image detection spot 74 (for example, the image detection spot 74 to which the addresses 4M to 40 and 5M to 50 are assigned) differs from the reference image depending on the presence or absence of the human shadow 82. However, since the human shadow 82 does not appear clearly in the image data as compared with a case where the person 81A is actually present, a difference between the image data and the reference data is relatively small in a portion of the human shadow 82. As a result, these corresponding image detection spots 74 are classified into the temporary ON state. For example, the image detection spot 74 in which a person, an object, a shadow, or the like does not exist and the image data is substantially the same as the reference image is classified into the OFF state.

In other words, the image detection determiner 104 compares the reference image with the image data and obtains the number of pixels of the image data in which the difference in a luminance value from the reference image is equal to or larger than a predetermined threshold for each image detection spot 74. For example, in a case where the number of pixels is larger than a first pixel number threshold, the image detection determiner 104 classifies the image detection spot 74 into the ON state. In a case where the number of pixels is smaller than a second pixel number threshold smaller than the first pixel number threshold, the image detection determiner 104 classifies the image detection spots 74 into the OFF state. In a case where the number of pixels is equal to or smaller than the first pixel number threshold and equal to or larger than the second pixel number threshold, the image detection determiner 104 classifies the image detection spot 74 into the temporary ON state.

In step S103, the image detection determiner 104 determines whether or not all the image detection spots 74 are in the OFF state. In a case where all the image detection spots 74 are in the OFF state (Y in step S103), the image detection determiner 104 determines that no person or object is detected by the image sensor 31B and supplies the determination result that all the image detection spots 74 are in the OFF state to the infrared data acquisition unit 101, and the detection process S100 proceeds to step S109. After the infrared detection process is executed in step S109, the detection process S100 ends. The infrared detection process will be described later.

In a case where all the image detection spots 74 are not in the OFF state (N in step S103), the detection process S100 proceeds to step S104.

In step S104, the image detection determiner 104 determines whether or not there is the image detection spot 74 in the ON state. In a case where there is no image detection spot 74 in the ON state (N in step S104), the image detection spot 74 in the temporary ON state is present in the image detection area 73. This is because it is determined in step S103 that all the image detection spots 74 are not in the OFF state, and it is determined in step S104 that there is no image detection spot in the ON state. At this time, the image detection determiner 104 provisionally determines that a person or an object has been detected and supplies a temporary ON state signal to the determiner 105, and the detection process S100 proceeds to step S110. After a combined detection process is executed in step S110, the detection process S100 ends. The combined detection process will be described later.

In a case where there is the image detection spot 74 in the ON state (Y in step S104), the image detection determiner 104 determines that a person or an object is detected by the image sensor 31B, and the detection process S100 proceeds to step S105.

In step S105, the determiner 105 determines whether the detected person or object is moving. For example, the determiner 105 reads previous image data (for example, the image data of one frame before) from the storage unit 107 and determines whether the position of the image detection spot 74 in the ON state is different between the previous image data and the current image data. In a case where the position of the image detection spot 74 in the ON state is different, the determiner 105 determines that the detected person or object is moving. Similarly, in a case where a person or an object is detected using the infrared sensor 31A, in a case where a position of the infrared detection spot 72 in the ON state is different between the previous infrared data and the current infrared data, it is determined that the detected person or object is moving. In a case where the detected person or object is moving (Y in step S105), the detection process S100 proceeds to step S106. In a case where the detected person or object is not moving (N in step S105), the detection process S100 ends.

In step S106, the determiner 105 determines whether a motion vector of the detected person or object is moving toward the opening. For example, the determiner 105 obtains, as the motion vector, a change from the position of the image detection spot 74 in the ON state in the previous image data to the position of the image detection spot 74 in the ON state in the current image data. Here, in a case where the plurality of image detection spots 74 adjacent to each other is in the ON state, it is assumed that a person or an object is constituted by an aggregate of the plurality of image detection spots 74, and the motion vector of the person or the object by the aggregate of the image detection spots is calculated (see FIG. 3). In this case, a starting point or an ending point of the motion vector may be, for example, a position of a center of gravity in the opening/closing direction of the aggregate of image detection spots in the opening/closing direction of the automatic door 100, and a position of a point closest to the opening of the automatic door 100 in the image detection spot 74 closest to the opening of the automatic door 100 in the depth direction of the automatic door 100. As in the example of FIG. 3, in a case where the person 81A is walking toward the opening of the automatic door 100, it is determined that the motion vector of the person 81A is moving toward the opening of the automatic door 100. On the other hand, in a case where the person 81B passes in front of the automatic door 100, it is determined that the motion vector of the person 81B is not moving toward the opening of the automatic door 100. In a case where the person 81B is moving toward the opening (Y in step S106), the detection process S100 proceeds to step S107. In a case where the person 81B is not moving toward the opening (N in step S106), the detection process S100 ends.

In step S107, the determiner 105 transmits an activation signal for activating the automatic door 100 to the control unit 106.

In step S108, the control unit 106 controls the door engine 40 to open the movable door 11 in response to the activation signal. Accordingly, this allows a passerby to pass through the automatic door 100. After step S108, the detection process S100 ends.

Figure 6:
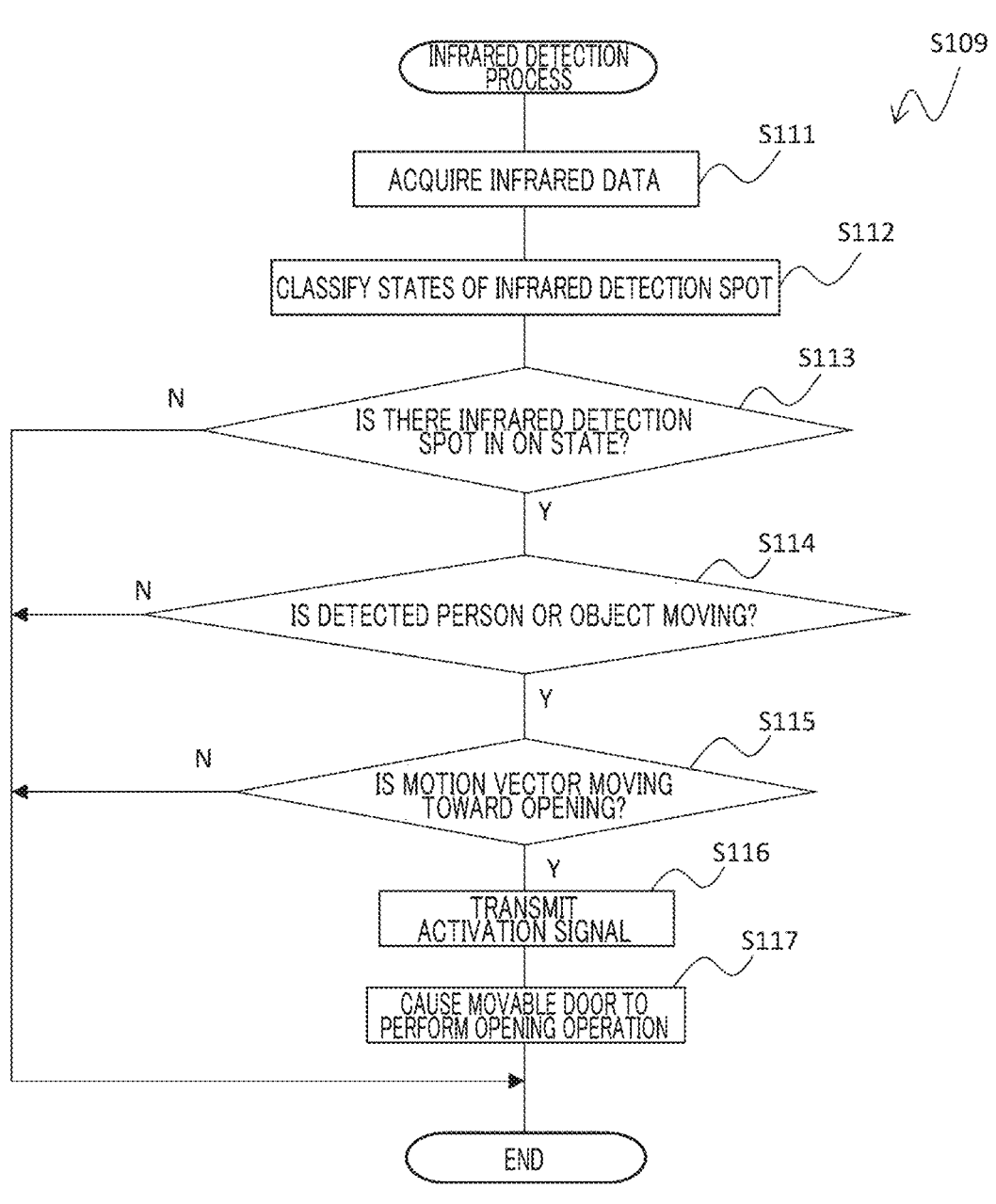
FIG. 6 is a flowchart of an infrared detection process of the automatic door according to the first embodiment.

The infrared detection process S109 will be described with reference to FIG. 6. Steps S114 to S117 are basically similar to steps S105 to S108 described above except for the points particularly mentioned, and thus the description thereof will be omitted.

In step S111, the infrared data acquisition unit 101 acquires the infrared data from the infrared sensor 31A. The infrared data acquisition unit 101 supplies the acquired infrared data to the infrared detection determiner 103.

In step S112, the infrared detection determiner 103 classifies the state of each infrared detection spot 72 into any of the ON state, the temporary ON state, and the OFF state based on the infrared data. Reference is made again to FIG. 3. For example, in a case where the person 81B is in the infrared detection area 71, the light reception amount of the infrared data of the corresponding infrared detection spot 72 (for example, the infrared detection spot 72 to which the addresses 3I to 5I and 3J to 5J are assigned) is larger than a reference value of the infrared detection spot. As a result, the infrared detection spot 72 is classified into the ON state. In a case of the infrared detection spot 72 in which a person, an object, a puddle, or the like does not exist, the light reception amount in the corresponding infrared detection spot 72 substantially does not change from a reference value of the infrared detection spot 72. As a result, the infrared detection spot 72 is classified into the OFF state. For example, in a case where there is a puddle 83 in the infrared detection area 71, the light reception amount in the infrared data of the corresponding infrared detection spot 72 (for example, the infrared detection spot 72 to which the addresses 3C to 3E are assigned) varies from the reference value of the infrared detection spot 72 but is smaller than the light reception amount when the person 81B is detected. As a result, the infrared detection spot 72 is classified into the temporary ON state.

In other words, the infrared detection determiner 103 obtains, for each infrared detection spot 72, a difference between the light reception amount reflected from each infrared detection spot 72 and the reference value for each infrared detection spot 72 based on the infrared data. In a case where the difference is larger than a first light reception amount threshold, the infrared detection spot 72 is classified into the ON state. In a case where the difference is smaller than a second light reception amount threshold smaller than the first light reception amount threshold, the infrared detection spot 72 is classified into the OFF state. In a case where the difference is equal to or smaller than the first light reception amount threshold and equal to or larger than the second light reception amount threshold, the infrared detection spot 72 is classified into the temporary ON state. Note that in the present embodiment, the second light reception amount threshold is set such that the light reception amount of the human shadow 82 is equal to or less than the second light reception amount threshold. Therefore, the infrared detection spot 72 where the human shadow 82 exists is classified into the OFF state.

In step S113, the infrared detection determiner 103 determines whether or not there is the infrared detection spot 72 in the ON state. In a case where there is the infrared detection spot 72 in the ON state (Y in step S113), a determination result indicating that there is the infrared detection spot 72 in the ON state is supplied to the determiner 105, and the detection process S100 proceeds to step S114. Such a case where all the image detection spots 74 are in the OFF state and any one of the infrared detection spots 72 is in the ON state includes, for example, a case where a color of clothes worn by a person passing through the automatic door 100 is close to a color of flooring. In a case where the infrared detection area 71 has a single detection area outside the image detection area 73, it is conceivable that a person or an object is present in the single detection area. On the other hand, in a case where there is no infrared detection spot 72 in the ON state (N in step S113), no person or object is detected near the opening of the automatic door 100, and the infrared detection process S109 ends. Since the detection process S100 ends after the infrared detection process S109 ends, in this case, the movable door 11 does not perform the opening operation.

In step S114, the determiner 105 determines whether the detected person or object is moving. In a case where the detected person or object is moving (Y in step S114), the infrared detection process S109 proceeds to step S115. In a case where the detected person or object is not moving (N in step S114), the infrared detection process S109 ends.

In step S115, the determiner 105 determines whether the motion vector of the detected person or object is moving toward the opening. In a case where the vector is moving toward the opening (Y in step S115), the infrared detection process S109 proceeds to step S116. In a case where the vector is not moving toward the opening (N in step S115), the infrared detection process S109 ends.

In step S116, the determiner 105 transmits the activation signal for activating the automatic door 100 to the control unit 106.

In step S117, the control unit 106 controls the door engine 40 to open the movable door 11 in response to the activation signal. After step S117, the infrared detection process S109 ends.

Figure 7:
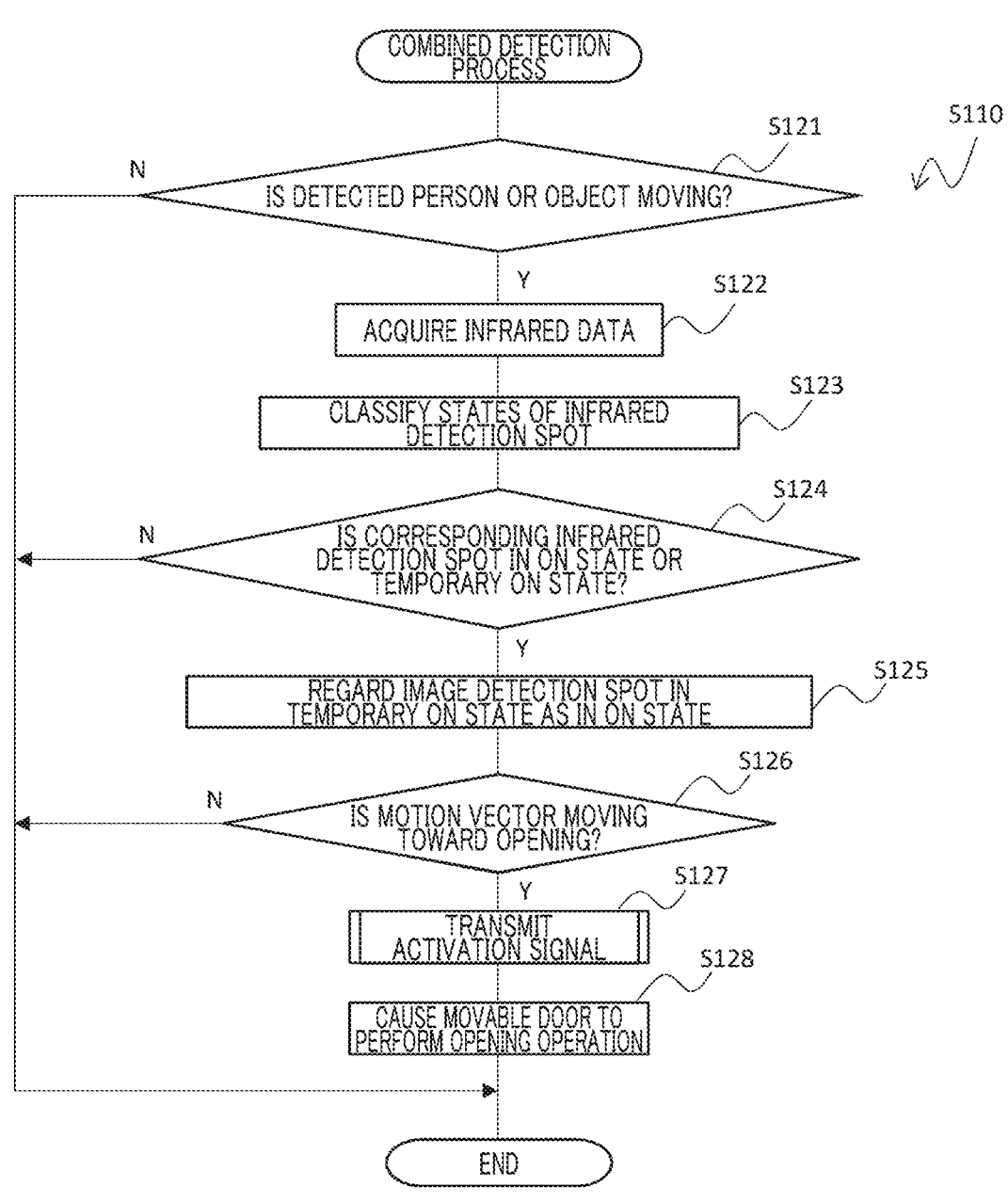
FIG. 7 is a flowchart of a combined detection process of the automatic door according to the first embodiment.

The combined detection process S110 will be described with reference to FIG. 7. Steps S121 and S126 to S128 are basically the same as steps S105 and S106 to S108 described above except for the points particularly mentioned, and thus the description thereof will be omitted.

In step S121, the determiner 105 determines whether the detected person or object is moving. In a case of moving (Y in step S121), the combined detection process S110 proceeds to step S122. In a case of not moving (N in step S121), the combined detection process S110 ends.

In step S122, the infrared data acquisition unit 101 acquires the infrared data from the infrared sensor 31A. The infrared data acquisition unit 101 supplies the acquired infrared data to the infrared detection determiner 103.

In step S123, the infrared detection determiner 103 classifies the state of each infrared detection spot 72 into any of the ON state, the temporary ON state, and the OFF state based on the infrared data. Step S123 is the same as step S112 except for the points particularly mentioned, and thus the description thereof will be omitted.

In step S124, the infrared detection determiner 103 determines whether the infrared detection spot 72 corresponding to the image detection spot 74 in the temporary ON state is in the ON state or the temporary ON state. In step S124, a case where the image detection spot 74 (the image detection spot 74 having the address of 4M to 4O or 5M to 5O) having the human shadow 82 in FIG. 3 is classified into the temporary ON state will be described as an example. The infrared detection determiner 103 determines whether the infrared detection spot 72 (the infrared detection spot 72 with the addresses of 4M and 5M) at a position overlapping with the image detection spot 74 in the temporary ON state is in the ON state or the temporary ON state. Here, as described above, in the present embodiment, the second light reception amount threshold is set such that the light reception amount by the human shadow 82 is equal to or less than the second light reception amount threshold. Therefore, the infrared detection spot 72 where the human shadow 82 exists is not classified as the ON state or the temporary ON state but classified as the OFF state. In this case, the infrared detection determiner 103 determines that the infrared detection spots 72 having addresses of 4M and 5M are not in the ON state or the temporary ON state.

In a case where the corresponding infrared detection spot 72 is in the ON state or the temporary ON state (Y in step S124), the infrared detection determiner 103 supplies the image on switching signal to the determiner 105, and the combined detection process S110 proceeds to step S125. In a case where the corresponding infrared detection spot 72 is not in the ON state or the temporary ON state, that is, in a case where the corresponding infrared detection spot 72 is in the OFF state (N in step S124), the infrared detection determiner 103 determines that no person or object is detected by the infrared sensor 31A, and the combined detection process S110 ends. Therefore, in a case where the image detection spot 74 is in the temporary ON state and the infrared detection spot 72 corresponding to the image detection spot 74 is in the OFF state, no person or object is detected, and the movable door 11 does not perform the opening operation.

In step S125, the determiner 105 regards the image detection spot 74 in the temporary ON state as the ON state and switches the state of the image detection spot 74 from the temporary ON state to the ON state. Therefore, the determiner 105 determines that a person or an object is detected by the image sensor 31B.

In a case where it is determined in step S126 that the motion vector is moving toward the opening (Y in step S126), the movable door 11 performs the opening operation after execution of steps S127 and S128. Therefore, in a case where the image detection spot 74 is in the temporary ON state and the infrared detection spot 72 corresponding to the image detection spot 74 is in the ON state or the temporary ON state, if the sensing condition in step S126 is satisfied (Y in step S126), the movable door 11 performs the opening operation. Note that in a case where the image detection spot 74 is in the temporary ON state and the infrared detection spot 72 corresponding to the image detection spot 74 is in the OFF state, even if the infrared detection spot 72 at a position different from the image detection spot 74 is in the temporary ON state, the image detection spot 74 is not considered to be in the ON state, and the movable door 11 does not perform the opening operation.

In summary, in a case where at least one of the infrared detection spot 72 and the image detection spot 74 is in the ON state, that is, in a case where at least one of the infrared detection determiner 103 and the image detection determiner 104 determines that a person or an object is detected, the automatic door 100 is activated when a predetermined sensing condition (steps S105, S106, S114, S115, and the like) is satisfied. In a case where the image detection spot 74 is in the temporary ON state, if the infrared detection spot 72 corresponding to the image detection spot 74 is in the ON state or the temporary ON state and satisfies a predetermined sensing condition (steps S121, S126, and the like), the automatic door 100 is activated.

Note that in the present embodiment, whether the image detection spot 74 classified as the temporary ON state corresponds to the ON state or the OFF state is determined based on the state of the infrared detection spot 72 (for example, step S124), but the present invention is not limited thereto. For example, whether the infrared detection spot 72 classified as the temporary ON state corresponds to the ON state or the OFF state may be determined based on the state of the image detection spot 74 at the same position as the infrared detection spot 72. In other words, in a case where one of the infrared detection spot 72 and the image detection spot 74 is classified into the temporary ON state, it may be determined which one of the ON state and the OFF state corresponds to, based on the classification of the other detection spot at the same position.

Hereinafter, functions and effects of the present embodiment will be described.

Since the infrared detection area 71 is relatively narrow, a timing at which the sensing result of the infrared sensor 31A is obtained tends to be delayed, and eventually, the timing at which it is determined to open and drive the movable door 11 tends to be delayed. As a result, a passerby needs to decelerate or stand in front of the automatic door 100, and there is a problem that stress is given to the passerby.

On the other hand, in the automatic door, it is assumed that a person or an object is detected using the image sensor 31B having a detection area relatively wider than that of the infrared sensor 31A. However, in a case of using the image sensor 31B, the automatic door 100 is often set to be opened in consideration of safety when a thing that is difficult to determine whether the thing is a person or an object (for example, a shadow of a person due to back light) approaches. At this time, there is a problem that the automatic door 100 is opened earlier than necessary before the passerby actually reaches the detection area, or erroneous detection may occur even though there is no passerby who tries to pass through the automatic door 100 in the first place, and wasteful opening occurs.

The automatic door 100 of the present embodiment determines whether or not to perform the opening operation of the movable door 11 using both the infrared sensor 31A and the image sensor 31B. Specifically, the infrared detection determiner 103 and the image detection determiner 104 determine whether a person or an object is detected by the infrared sensor 31A and the image sensor 31B, respectively, and the determiner 105 determines whether to perform the opening operation of the movable door 11 based on the respective determination results of the infrared detection determiner 103 and the image detection determiner 104. According to the present configuration, in the automatic door 100, it is possible to determine whether or not to open the door at an earlier timing than the case of using the infrared sensor 31A alone, and it is possible to reliably determine whether or not a person or an object is detected as compared with the case of using the image sensor 31B alone.

Here, in a case where the infrared sensor 31A and the image sensor 31B are used together in the automatic door 100, it is assumed that both perform the detection process independently of each other. However, in this case, even if one of the infrared sensor 31A and the image sensor 31B correctly detects a person or an object, in a case where the other erroneously detects a person or an object, there is a possibility that an unexpected wasteful opening is caused.

In the present embodiment, each infrared detection spot 72 and each image detection spot 74 are classified into the ON state, the temporary ON state, and the OFF state. According to this configuration, a state in which it is difficult to determine whether the detection spot is in the ON state or the OFF state from the detection result of each of the infrared sensor 31A and the image sensor 31B can be set to the temporary ON state. In the present embodiment, in a case where both the infrared detection spot 72 and the image detection spot 74 at the same position are in the temporary ON state, at least one of the state of the infrared detection spot and the state of the image detection spot in the temporary ON state is regarded as the ON state. According to the present configuration, it is possible to determine whether or not to perform the opening operation of the movable door 11 based on the detection results of both the infrared sensor 31A and the image sensor 31B, and thus, it is possible to suppress the wasteful opening of the automatic door 100.

In the present embodiment, the image detection determiner 104 obtains the number of pixels in which a difference in luminance value between the image data of the image detection spot 74 and the reference image of the image detection spot 74 is equal to or larger than a predetermined threshold value. The image detection determiner 104 classifies the state of the image detection spot 74 into the ON state in a case where the number of pixels is larger than the first pixel number threshold, classifies the state into the OFF state in a case where the number of pixels is smaller than the second pixel number threshold which is smaller than the first pixel number threshold, and classifies the state into the temporary ON state in a case where the number of pixels is equal to or larger than the second pixel number threshold and equal to or smaller than the first pixel number threshold. According to this configuration, it is possible to accurately classify the state of the image detection spot 74 into any of the ON state, the temporary ON state, and the OFF state.

In the present embodiment, the infrared detection determiner 103 obtains a difference between the light reception amount for each infrared detection spot 72 and the reference value of the light reception amount determined for each infrared detection spot 72. The infrared detection determiner 103 classifies the state of the infrared detection spot 72 into the ON state in a case where the difference in the light reception amount is larger than the first light reception amount threshold, classifies the state into the OFF state in a case where the difference in the light reception amount is smaller than a second light reception amount threshold which is smaller than the first pixel number threshold, and classifies the state into the temporary ON state in a case where the difference in the light reception amount is equal to or larger than the second light reception amount threshold and equal to or smaller than the first light reception amount threshold. According to this configuration, it is possible to accurately classify the state of the infrared detection spot 72 into any of the ON state, the temporary ON state, and the OFF state.

In the present embodiment, the image detection area 73 is larger than the infrared detection area 71, and the determiner determines whether or not to perform the opening operation of the movable door 11 based on the determination result of the image detection determiner 104 in a region outside the infrared detection area 71 and inside the image detection area 73. According to this configuration, it is possible to suppress a delay in the timing of determining to perform the opening operation of the movable door 11.

The present invention has been described above based on the embodiments. It is to be understood by those skilled in the art that the embodiments are examples, various modifications can be made to combinations of the respective components and the respective processing processes, and such modifications are also within the scope of the present invention.

Hereinafter, the modifications will be described.

In the embodiment, whether a person or an object is detected is determined by the controller 20, but the present invention is not limited thereto, and for example, whether a person or an object is detected may be determined by the activation sensor unit 31. In this case, the activation sensor unit 31 includes the infrared detection determiner 103 and the image detection determiner 104, and may further include a sending determiner 108 (see FIG. 8) that determines whether to transmit a detection signal indicating that a person or an object is detected to the control unit 106 of the controller based on each determination result of the infrared detection determiner 103 and the image detection determiner 104. In this case, the activation sensor unit 31 is an example of an automatic door sensor.

In the embodiment, in step S125, the image detection spot 74 in the temporary ON state is regarded as the ON state, but the present invention is not limited thereto, and the infrared detection spot 72 in the temporary ON state may be regarded as the OFF state.

In the embodiment, the infrared detection determiner 103 determines that a person or an object is detected based on presence of at least one infrared detection spot 72 in the ON state, but the present invention is not limited thereto. The infrared detection determiner 103 may determine that a person or an object is detected based on a fact that the number of the infrared detection spots 72 in the ON state is equal to or larger than a predetermined number, or a total area of the infrared detection spots 72 in the ON state is equal to or larger than a predetermined total area. Similarly, the image detection determiner 104 may determine that a person or an object is detected based on the fact that the number of the image detection spots 74 in the ON state is equal to or larger than a predetermined number or equal to or larger than the predetermined total area.

In the embodiment, the state of the image detection spot 74 is classified based on a comparison between the number of pixels and the pixel number threshold by obtaining the number of pixels in which the difference between the luminance values is equal to or larger than the predetermined threshold. However, the present invention is not limited to this. For example, in a case where an edge of a person or an object is detected in the image detection spot 74 as a result of pixels having a difference in luminance value equal to or larger than a predetermined threshold being continuous with respect to adjacent pixels, the image detection spot 74 may be classified as the ON state. By obtaining the total area of the pixels in which the difference between the luminance values is the predetermined threshold or more in the image detection spot 74, the ON state, the temporary ON state, and the OFF state of the image detection spot 74 may be classified based on the comparison between the total area and predetermined first and second area thresholds. For example, the ON state, the temporary ON state, and the OFF state of the image detection spot 74 may be classified by the image recognition.

In the embodiment, the number of pixels in which the difference between the luminance values is equal to or larger than the predetermined threshold is obtained, but the present invention is not limited thereto. For example, the number of pixels in which a difference in color difference between the image data of the image detection spot 74 and the reference image of the image detection spot 74 is the predetermined threshold value or more may be obtained. Therefore, the number of pixels in which a difference between at least one of the luminance values and color values is equal to or larger than the predetermined threshold value may be obtained.

In the embodiment, the states of the infrared detection spot 72 and the image detection spot 74 are classified into the ON state, the temporary ON state, and the OFF state, respectively, but the present invention is not limited thereto. For example, the states of the infrared detection area 71 and the image detection area 73 may be classified into the ON state, the temporary ON state, and the OFF state, respectively. In this case, for example, as in the case of the infrared detection spot 72 and the image detection spot 74, in a case where both the infrared detection area 71 and the image detection area 73 are in the temporary ON state, at least one of the infrared detection area 71 and the image detection area 73 may be regarded as the ON state.

In the embodiment, the image data is first acquired in step S101, and the processing related to the classification of the image detection spot 74 based on the image data is executed, but the present invention is not limited thereto. After the infrared data is acquired first and the processing related to the classification of the infrared detection spots 72 is executed, the processing related to the classification of the image detection spots 74 based on the image data may be executed.

In the embodiment, the infrared detection area 71 is configured in the image detection area 73, but the present invention is not limited thereto, and may have an area outside the image detection area 73. In this case, the determiner 105 may determine whether or not to perform the opening operation of the automatic door 100 based on the determination result of the infrared detection determiner 103 in a region outside the image detection area 73 in the infrared detection area 71. The infrared detection area 71 may be larger than the image detection area 73. Moreover, the infrared detection area 71 and the image detection area 73 may completely coincide with each other.

In the embodiment, the infrared detection area 71 and the image detection area 73 at least partially overlap with each other, but the present invention is not limited thereto. For example, the infrared detection area 71 and the image detection area 73 may not overlap with each other. In this case, for example, when there are a predetermined number or more of the infrared detection spots 72 and the image detection spots 74 in the temporary ON state, at least one of the infrared detection spots 72 and the image detection spots 74 in the temporary ON state may be regarded as the ON state.

In the embodiment, after it is determined whether the detected person or object is moving or not (for example, step S105 or the like), it is determined whether the motion vector of the person or object is moving toward the opening of the automatic door 100 (for example, step S106 or the like), but the present invention is not limited thereto. For example, the motion vector of a person or an object may be obtained from a change to the position of the detection spot in the temporary ON state, and it may be determined whether the motion vector is moving toward the opening of the automatic door 100. In this case, for example, in a case where the image detection spot 74 is classified into the temporary ON state and the motion vector of the image detection spot 74 in the temporary ON state is moving toward the opening of the automatic door 100, the determiner 105 may determine to perform the opening operation when the infrared detection spot 72 at the position overlapping with the image detection spot 74 in the temporary ON state is classified into the temporary ON state. Also in a case where the processing related to the classification of the infrared detection spot 72 is executed before the processing related to the classification of the image detection spot 74 described above, similarly, in a case where the determiner 105 determines that the infrared detection spot 72 is classified into the temporary ON state and the motion vector of the infrared detection spot 72 in the temporary ON state is moving toward the opening of the automatic door 100, the determiner 105 may determine to perform the opening operation when the image detection spot 74 at the position overlapping with the infrared detection spot 72 in the temporary ON state is classified into the temporary ON state. Therefore, in a case where one of the infrared detection spot 72 and the image detection spot 74 is classified into the temporary ON state and the motion vector of the detection spot in the temporary ON state is moving toward the opening of the automatic door 100, the opening operation of the movable door 11 may be performed when the other of the infrared detection spot 72 and the image detection spot 74 at positions overlapping with the detection spot in the temporary ON state is classified into the temporary ON state.

In the embodiment, in a case where both the infrared detection spot 72 and the image detection spot 74 at positions overlapping with each other are in the temporary ON state, the state of the detection spot in the temporary ON state is regarded as the ON state so that the automatic door 100 opens in consideration of the safety of passing by. However, the state of the detection spot in the temporary ON state may be regarded as the OFF state.

In the embodiment, sizes of the infrared detection spot 72 and the image detection spot 74 are the same, but are not limited thereto, and the sizes may be different. In a case where the sizes thereof are different from each other, for example, when one of the infrared detection spot 72 and the image detection spot 74 is in the temporary ON state, the detection spot in the temporary ON state may be regarded as the ON state or the OFF state based on the classification by classifying the state of a portion where the spots overlap with each other in the other into the ON state, the temporary ON state, and the OFF state.

The determination of the motion vector in step S126 may be executed not after step S125 but after step S121. In a case where step S126 is executed after step S121, and it is determined in the image detection area 73 that the motion vector is moving toward the opening, steps S127 and S128 may be executed in response to the image detection spot 74 in the temporary ON state being regarded as the ON state in step S125 (when the infrared detection spot 72 is in the ON state or the temporary ON state). In particular, in a case where it is determined that the motion vector is moving toward the opening in the image detection area 73 outside the infrared detection area 71, steps S127 and S128 may be executed in response to the image detection spot 74 in the temporary ON state being regarded as the ON state in step S125 without determining the motion vector in the infrared detection area 71.

Types of the automatic door are not limited to the types of the embodiment, and for example, an automatic door of an individual control type using a linear motor, or an automatic door of a type in which a door is pulled by a chain or a chain wire may be used.

Second Embodiment

Hereinafter, a second embodiment of the present invention will be described. In the drawings and description of the second embodiment, the same or equivalent components and members as those of the first embodiment are denoted by the same reference numerals. The description overlapping with the first embodiment will be omitted as appropriate, and a configuration different from the first embodiment will be mainly described.

In the first embodiment, it is determined whether the controller 20 has detected a person or an object, but the present invention is not limited thereto. In the second embodiment, it is determined whether the door sensor 30 detects a person or an object.

Figure 8:
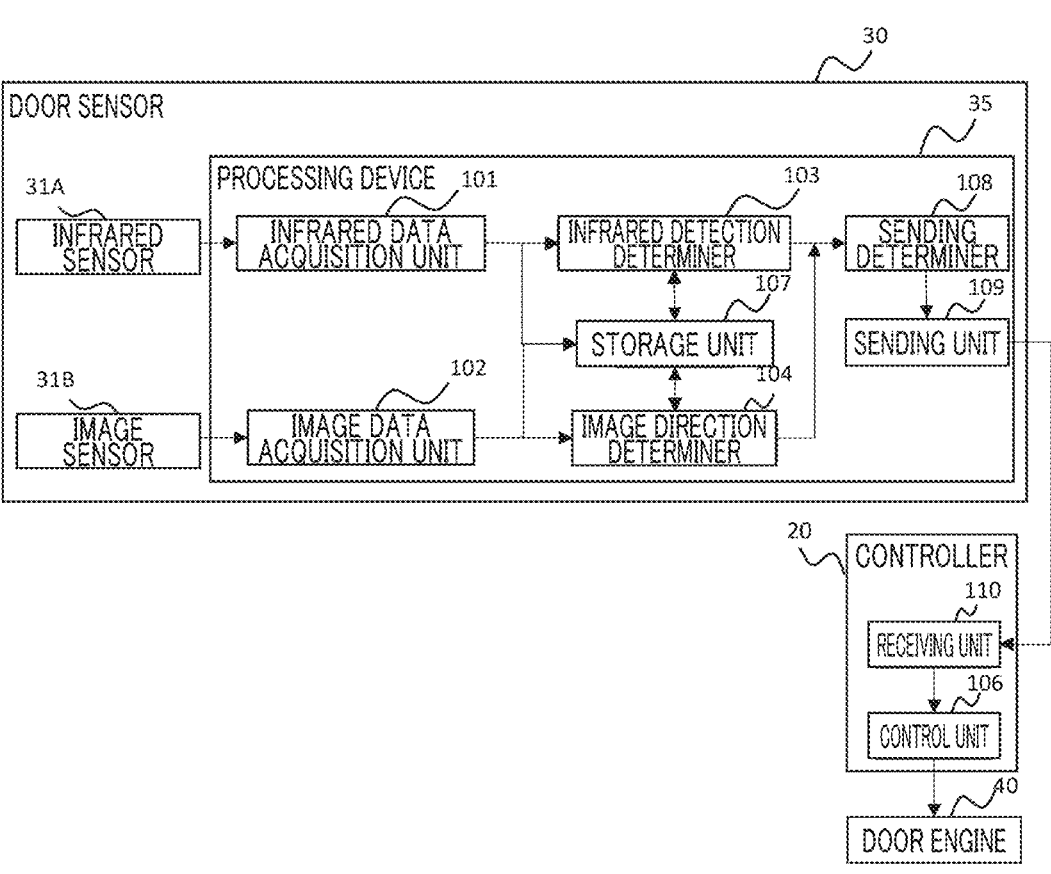
FIG. 8 is a functional block diagram of an automatic door according to a second embodiment.

Reference is made to FIG. 8. The door sensor 30 of the second embodiment includes the infrared sensor 31A, the image sensor 31B, and a processing device 35. The processing device 35 includes the infrared data acquisition unit 101, the image data acquisition unit 102, the infrared detection determiner 103, the image detection determiner 104, the storage unit 107, the sending determiner 108, and a sending unit 109. The controller 20 includes the control unit 106 and the receiving unit 110.

The sending determiner 108 determines whether to transmit a detection signal indicating that a person or an object is detected to the controller 20 based on each determination result of the infrared detection determiner 103 and the image detection determiner 104. The detection signal of the present embodiment is an example of an opening operation signal for causing the movable door 11 to perform the opening operation. For example, in a case of determining that at least one of the infrared detection determiner 103 and the image detection determiner 104 has detected a person or an object, the sending determiner 108 determines whether a predetermined sensing condition is satisfied, similarly to the determiner 105 described above. In a case where the predetermined sensing condition is satisfied, the sending determiner 108 determines to transmit the detection signal to the controller 20. The sending unit 109 transmits a detection signal to the controller 20 according to determination of the sending determiner 108.

The receiving unit 110 receives the detection signal transmitted from the sending unit 109 and supplies the detection signal to the control unit 106. In response to the detection signal, the control unit 106 controls the door engine 40 to open the movable door 11.

Third Embodiment

Hereinafter, a third embodiment of the present invention will be described. In the drawings and description of the third embodiment, the same or equivalent components and members as those of the first embodiment are denoted by the same reference numerals. The description overlapping with the first embodiment will be omitted as appropriate, and a configuration different from the first embodiment will be mainly described.

In the present embodiment, the storage unit (not illustrated) of the infrared sensor 31A stores the reference light reception amount of detection light reflected by each infrared detection spot 72 and received by the infrared sensor 31A for each infrared detection spot 72. The infrared sensor 31A according to the present embodiment classifies each infrared detection spot 72 into the ON state or the OFF state based on the light reception amount of the detection light. The infrared sensor 31A performs detection determination as to whether a person or an object has been detected based on the infrared detection spot 72 in the ON state. The infrared sensor 31A of the present embodiment transmits, to the controller 20, the infrared data including a detection determination result as to whether a person or an object has been detected, a classification result of the ON state or the OFF state for each infrared detection spot 72, and the light reception amount of the infrared detection area 71.

As illustrated in FIG. 3, for example, in a case where persons 81A and 81B are present in the infrared detection area 71, the light reception amount at the corresponding infrared detection spot 72 (for example, the infrared detection spots 72 to which addresses 3F to 5F, 3G to 5G, and addresses 3I to 5I, 3J to 5J are assigned) is sufficiently larger than the reference light reception amount of the infrared detection spot. As a result, the infrared detection spot 72 is classified into the ON state. For example, in a case of the infrared detection spot 72 where no person, object, or the like exists, the light reception amount at the infrared detection spot 72 is substantially equal to the reference light reception amount of the infrared detection spot 72. As a result, the infrared detection spot 72 is classified into the OFF state.

In the present embodiment, the storage unit (not illustrated) of the image sensor 31B stores the reference image of the image detection area 73. The image sensor 31B of the present embodiment classifies each image detection spot 74 into either the ON state or the OFF state based on the luminance value of each pixel of each image detection spot 74. The image sensor 31B of the present embodiment performs the detection determination as to whether a person or an object has been detected based on whether the number of image detection spots 74 in the ON state is equal to or larger than a predetermined number of spots. The image sensor 31B of the present embodiment transmits, to the controller 20, the image data including the detection determination result as to whether a person or an object has been detected, the classification result of the ON state or the OFF state for each image detection spot 74, and the luminance value of each pixel of each image detection spot 74.

As illustrated in FIG. 3, for example, in a case where the persons 81A and 81B are present in the image detection area 73, the luminance value of each pixel in the corresponding image detection spot 74 (for example, the image detection spot 74 to which the addresses 3F to 5F, 3G to 5G, and the addresses 3I to 5I, 3J to 5J are assigned) is greatly different from the luminance value of each pixel in a reference image of the image detection spot 74. As a result, an occupancy degree to be described later becomes equal to or greater than an occupancy threshold, and the image detection spot 74 is classified into the ON state. For example, in the case of the image detection spot 74 where no person, object, or the like exists, the luminance value at the image detection spot 74 is substantially equal to the luminance value of the reference image of the image detection spot 74. As a result, the occupancy degree to be described later becomes less than the occupancy threshold, and the image detection spot 74 is classified into the OFF state.

Figure 9:
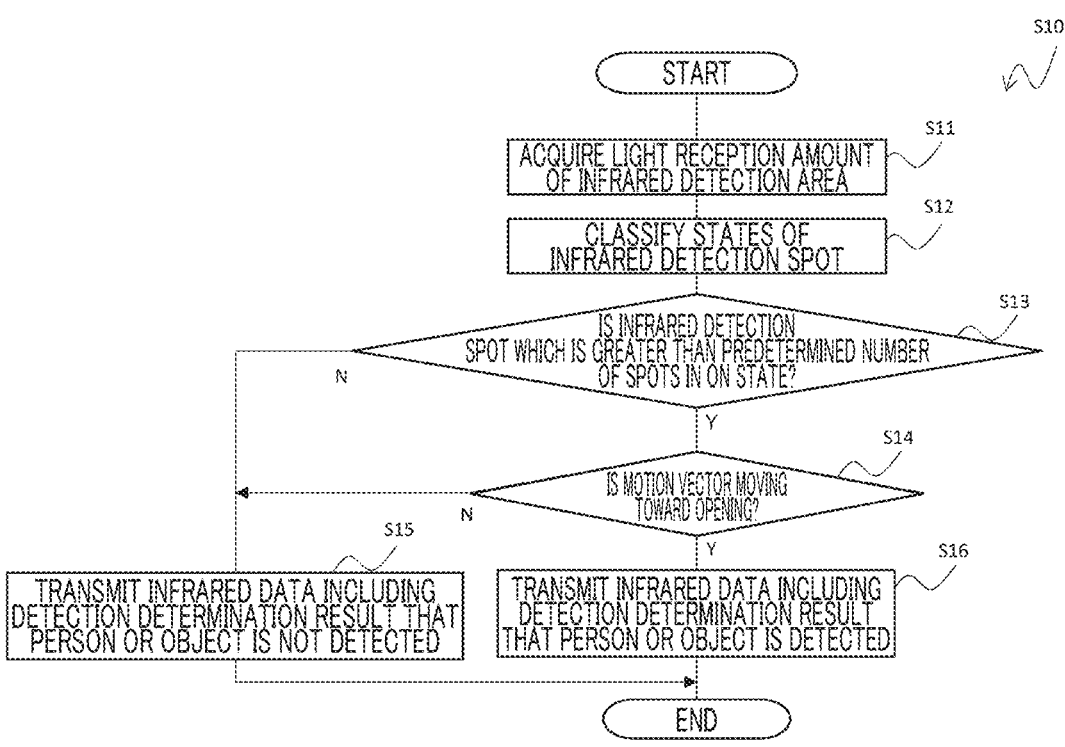
FIG. 9 is a flowchart of a detection process of an infrared sensor according to a third embodiment.

With reference to FIG. 9, a person or object detection operation S10 of the infrared sensor 31A of the present embodiment will be described. FIG. 9 is a flowchart illustrating detection operation S10 of a person or an object in the infrared sensor 31A of the present embodiment. The detection operation S10 is executed at predetermined time intervals.

In step S11, the infrared sensor 31A acquires the light reception amount in the infrared detection area 71.

In step S12, the infrared sensor 31A classifies the state of each infrared detection spot 72. For example, the infrared sensor 31A obtains, for each infrared detection spot 72, a difference between the light reception amount reflected from each infrared detection spot 72 and the reference light reception amount for each infrared detection spot 72. In a case where the difference in the light reception amount is larger than the third light reception amount threshold, the infrared sensor 31A classifies the infrared detection spot 72 into the ON state. The third light reception amount threshold of the present embodiment is an example of a detection reference. In a case where the difference is equal to or smaller than the third light reception amount threshold, the infrared detection spot 72 classifies the infrared detection spot 72 into the OFF state.

In step S13, the infrared sensor 31A determines whether or not the infrared detection spots 72 of a predetermined number of spots or more are in the ON state. The predetermined number of spots may be one or more. In a case where the number of infrared detection spots 72 equal to or larger than the predetermined number of spots is in the ON state (Y in step S13), the detection operation S10 proceeds to step S14. In a case where the number of infrared detection spots 72 equal to or larger than the predetermined number of spots is not in the ON state (N in step S13), the detection operation S10 proceeds to step S15.

In step S14, the infrared sensor 31A determines whether the motion vector of the infrared detection spot 72 in the ON state is moving toward the opening. For example, the infrared sensor 31A obtains, as the motion vector, the change from the position of the infrared detection spot 72 that was in the ON state before (for example, one frame before) to the position of the infrared detection spot 72 that is in the ON state at a current time point. As in the example of FIG. 3, in a case where the person 81A is walking toward the opening of the automatic door 100, it is determined that the motion vector of the infrared detection spot 72 corresponding to the person 81A is moving toward the opening of the automatic door 100. On the other hand, in a case where the person 81B passes in front of the automatic door 100, it is determined that the motion vector of the infrared detection spot 72 corresponding to the person 81B is not moving toward the opening of the automatic door 100. In a case where the motion vector is moving toward the opening (Y in step S14), it is determined that the infrared sensor 31A detects a person or an object, and the detection operation S10 proceeds to step S16. In a case where the motion vector is not moving toward the opening (N in step S14), it is determined that the infrared sensor 31A does not detect a person or an object, and the detection operation S10 proceeds to step S15.

In step S15, the infrared sensor 31A transmits, to the controller 20, the infrared data including the detection determination result indicating that no person or object is detected, the classification result of an ON state or an OFF state for each infrared detection spot 72, and the light reception amount of the infrared detection area 71. Thereafter, the detection operation S10 ends.

In step S16, the infrared sensor 31A transmits, to the controller 20, the infrared data including the detection determination result indicating that a person or an object is detected, the classification result of the ON state or the OFF state for each infrared detection spot 72, and the light reception amount in the infrared detection area 71. Thereafter, the detection operation S10 ends.

Figure 10:
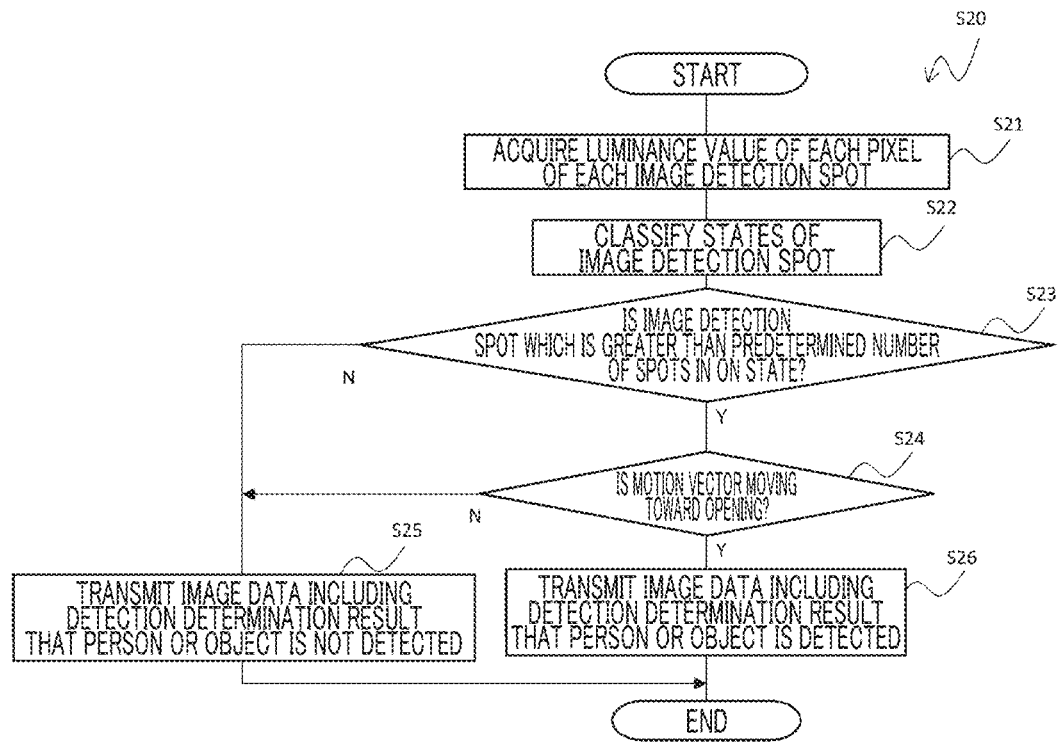
FIG. 10 is a flowchart of a detection process of an image sensor according to the third embodiment.

A detection operation S20 of a person or an object in the image sensor 31B of the present embodiment will be described with reference to FIG. 10. FIG. 10 is a flowchart illustrating the detection operation S20 of a person or an object in the image sensor 31B of the present embodiment. The detection operation S20 is executed at predetermined time intervals.

In step S21, the image sensor 31B acquires the luminance value of each pixel of each image detection spot 74 in the image detection area 73.

In step S22, the image sensor 31B classifies the state of each image detection spot 74. For example, the image sensor 31B calculates the difference in luminance value between each pixel and each pixel of the reference image for each image detection spot 74. The image sensor 31B compares the difference calculated for each pixel with a luminance threshold and calculates the occupancy degree indicating the occupancy degree of the pixel (hereinafter, the pixel may be referred to as a difference pixel) whose calculated difference is larger than the luminance threshold in the image detection spot 74. The occupancy degree is, for example, the number of the difference pixels or the total area in the image detection spot 74. In a case where the occupancy degree is smaller than a predetermined occupancy threshold, the image sensor 31B classifies the image detection spot 74 into the OFF state. In a case where the occupancy degree is equal to or greater than the predetermined occupancy threshold, the image sensor 31B classifies image detection spot 74 into the ON state.

In step S23, the image sensor 31B determines whether or not the image detection spots 74 of a predetermined number of spots or more are in the ON state. The predetermined number of spots may be one or more. In a case where the image detection spots 74 of the predetermined number of spots or more are in the ON state (Y in step S23), the detection operation S20 proceeds to step S24. In a case where the image detection spots 74 of the predetermined number of spots or more are not in the ON state (N in step S23), the detection operation S20 proceeds to step S25.

In step S24, the image sensor 31B determines whether the motion vector of the image detection spot 74 in the ON state is moving toward the opening. This determination method is similar to step S14. In a case where the motion vector is moving toward the opening (Y in step S24), the image sensor 31B determines that a person or an object is detected, and the detection operation S20 proceeds to step S26. In a case where the motion vector is not moving toward the opening (N in step S24), it is determined that the image sensor 31B does not detect a person or an object, and the detection operation S20 proceeds to step S25.

In step S25, the image sensor 31B transmits, to the controller 20, image data including the detection determination result indicating that no person or object is detected, the classification result of the ON state or the OFF state for each image detection spot 74, and the luminance value of each pixel in the image detection area 73. Thereafter, the detection operation S20 ends.

In step S26, the image sensor 31B transmits, to the controller 20, the image data including the detection determination result indicating that a person or an object is detected, the classification result of the ON state or the OFF state for each image detection spot 74, and the luminance value of each pixel in the image detection area 73. Thereafter, the detection operation S20 ends.

Figure 11:
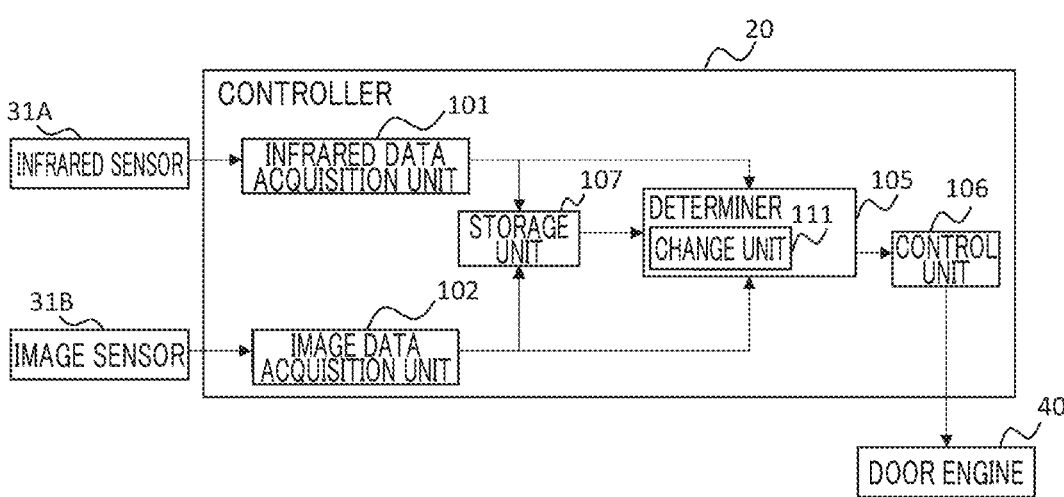
FIG. 11 is a functional block diagram of an automatic door according to the third embodiment.

FIG. 11 is a functional block diagram of the controller 20 according to the present embodiment. The controller 20 includes the infrared data acquisition unit 101, the image data acquisition unit 102, the determiner 105, the control unit 106, and the storage unit 107.

The determiner 105 of the present embodiment determines whether or not to perform the opening operation of the movable door 11 of the automatic door 100 based on the infrared data and the image data for the area in which the infrared detection area 71 and the image detection area 73 overlap with each other. The determiner 105 includes a change unit 111 that changes a detection determination result of at least one of the infrared sensor 31A and the image sensor 31B based on the infrared data and the image data. In the present embodiment, the determiner 105 determines whether or not to perform the opening operation of the movable door 11 of the automatic door 100 based on the changed detection determination result.

Reference is now made again to FIG. 3. For example, in a case where the puddle 83 is present in the infrared detection area 71, there is a difference between the light reception amount reflected from a portion where the puddle 83 is present in the infrared detection area 71 and the reference light reception amount of the infrared detection spot 72. The difference between the light reception amount in the infrared data of the infrared detection spot 72 where the puddle 83 is present and the reference light reception amount of the infrared detection spot 72 is smaller than that in the case of a person or an object but may be larger than the light reception amount threshold. At this time, the infrared detection spot 72 is classified into the ON state, and the puddle 83 or the like is erroneously detected as a person or an object. In the conventional automatic door, whether or not to perform the opening operation is determined using the detection determination result of the infrared sensor 31A. Therefore, if the conditions of steps S13 and S14 described above are satisfied due to fluctuation of a water surface of the puddle 83 or the like, the automatic door is wastefully opened by a target that is not originally required to perform the opening operation.

In the automatic door 100 of the present embodiment, whether or not to perform the opening operation of the movable door 11 of the automatic door 100 is determined based on the infrared data and the image data for the area in which the infrared detection area 71 and the image detection area 73 overlap with each other. According to the present configuration, since it is possible to determine whether or not to perform the opening operation based on the infrared data and the image data, it is possible to reliably determine whether or not a person or an object has been detected as compared with the case of using the infrared sensor 31A alone.

Figure 12:
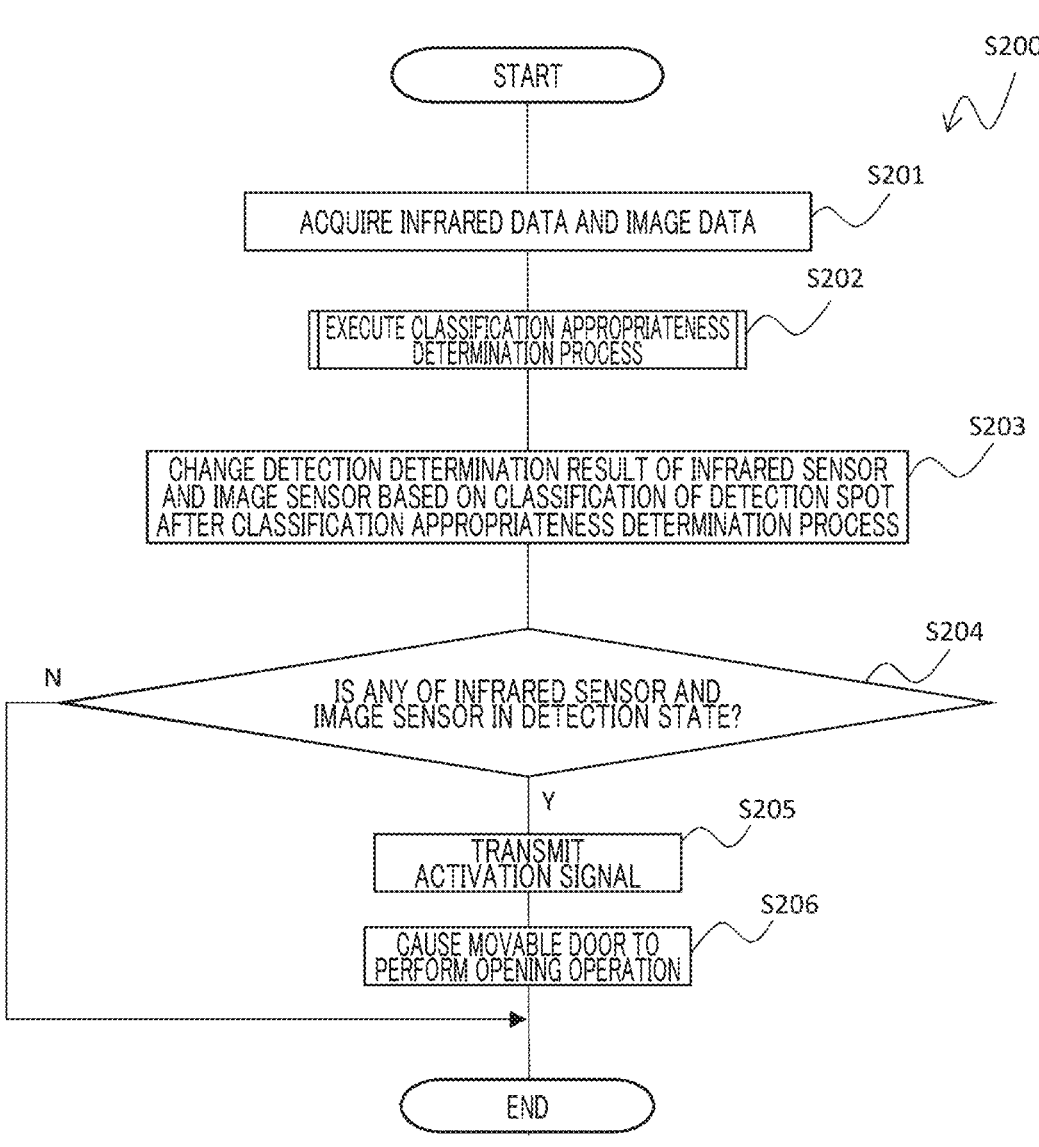
FIG. 12 is a flowchart of processing of the automatic door according to the third embodiment.

The operation of the controller 20 of the present embodiment will be described with reference to FIG. 12. FIG. 12 is a flowchart illustrating a process S200 in the controller 20 of the present embodiment. The process S200 is executed at predetermined time intervals.

In step S201, the infrared data acquisition unit 101 and the image data acquisition unit 102 acquire the infrared data and the image data from the infrared sensor 31A and the image sensor 31B, respectively. The infrared data acquisition unit 101 and the image data acquisition unit 102 supply the acquired infrared data and image data to the change unit 111.

Figure 13:
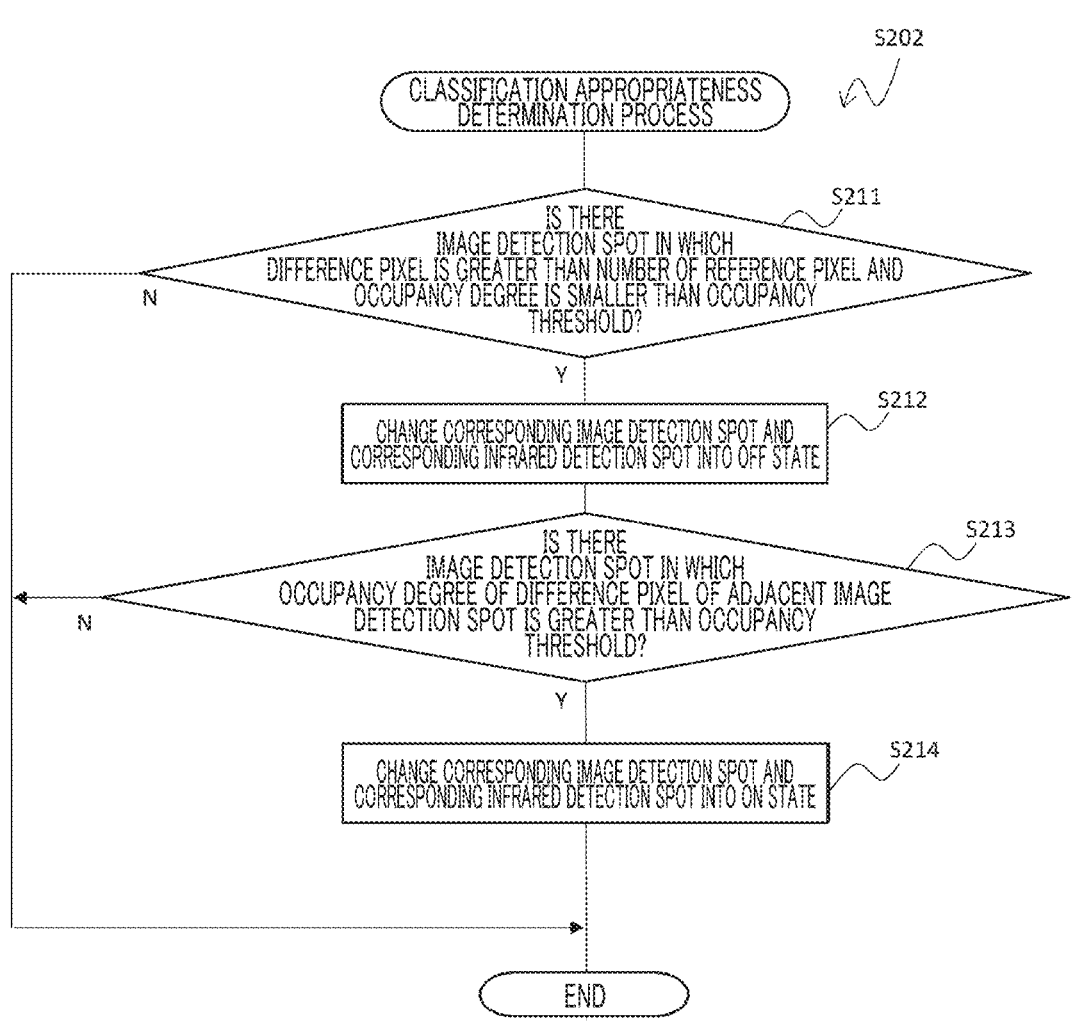
FIG. 13 is a flowchart of a classification appropriateness determination process of the automatic door according to the third embodiment.

In step S202, the change unit 111 executes a classification appropriateness determination process of the detection spot. The classification appropriateness determination process will be described with reference to FIG. 13.

In step S211, the change unit 111 determines whether there is the image detection spot 74 in which the number of difference pixels is equal to or larger than the number of reference pixels and the occupancy degree is smaller than the occupancy threshold in the image detection area 73 overlapping with the infrared detection area 71. In a case where there is no corresponding image detection spot 74 (N in step S211), the classification appropriateness determination process S202 ends. In a case where there is the corresponding image detection spot 74 (Y in step S211), the classification appropriateness determination process S202 proceeds to step S212.

Figure 14:
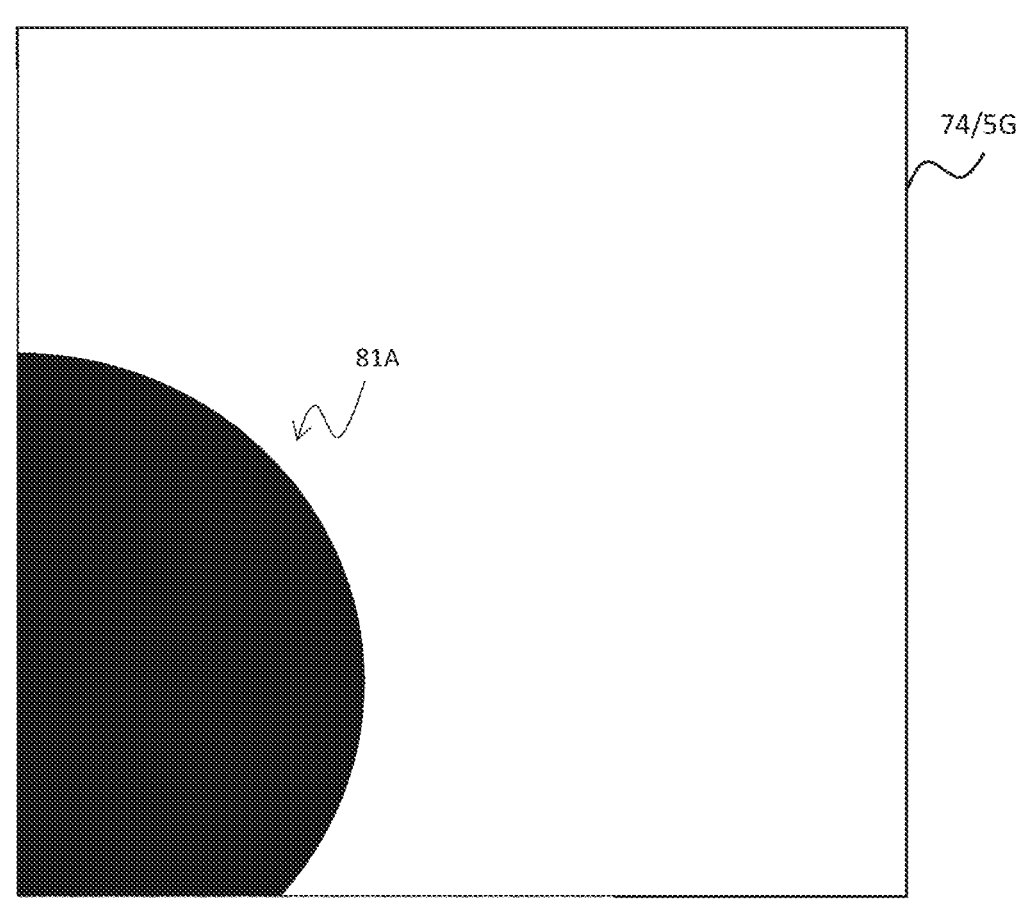
FIG. 14 is a diagram illustrating an example of difference pixels in an image detection spot.
Figure 15:
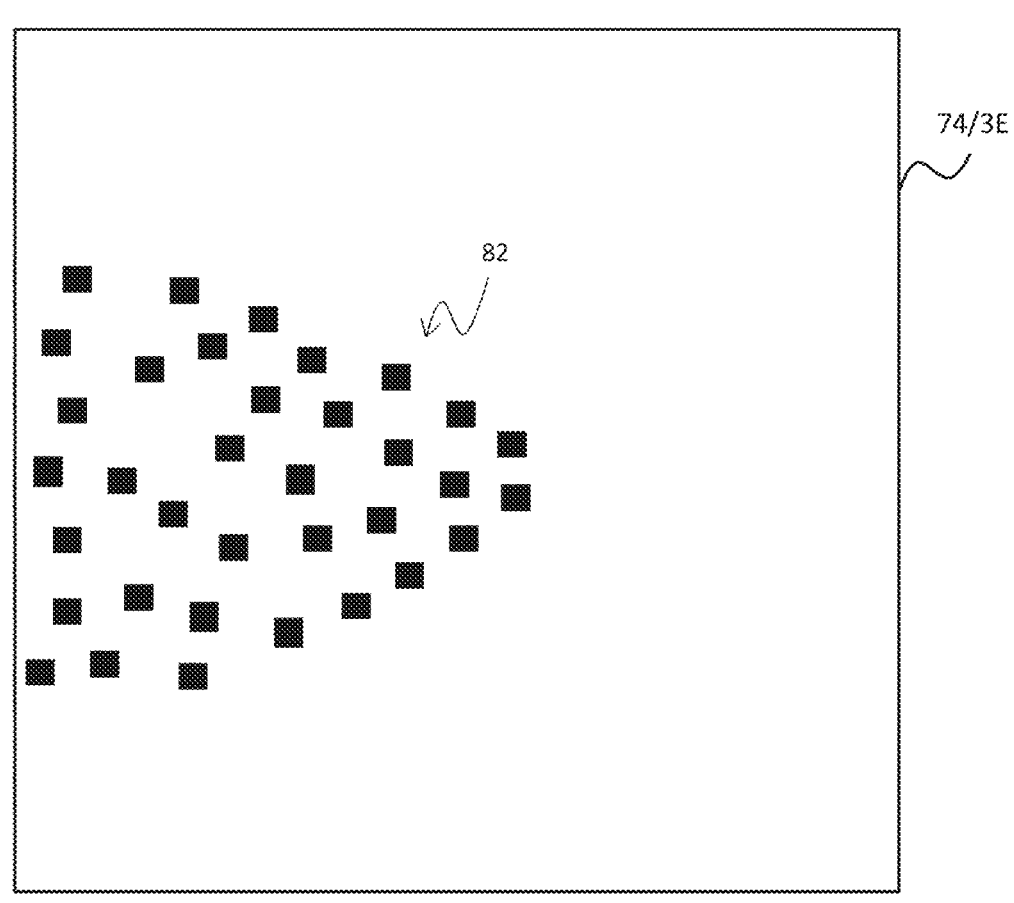
FIG. 15 is a diagram illustrating an example of difference pixels in an image detection spot.

Reference is made to FIG. 14 and FIG. 15. FIG. 14 illustrates the difference pixels in the image detection spot 74 at the address 5G at which a head of the person 81A is present, and FIG. 15 illustrates the difference pixels in the image detection spot 74 at the address 3E at which the puddle 83 is present. In the image detection spot 74 in which the head of the person 81A is present (illustrated in FIG. 14), the difference pixels are continuously densely arranged without a gap at the position of the head of the person 81A. As a result, in the image detection spot 74, the occupancy degree tends to increase, and tends to be equal to or greater than the occupancy threshold. On the other hand, in the image detection spot 74 where the puddle 83 illustrated in FIG. 15 is present, the difference pixels are intermittently scattered at the position of the puddle 83. This is because, for example, depending on reflection of light due to the fluctuation of the water surface of the puddle 83 or the like, a portion where the difference exceeds the luminance threshold and a portion where the difference does not exceed the luminance threshold appear. As a result, in the image detection spot 74, the occupancy degree tends to be small, and tends to be smaller than the occupancy threshold. Therefore, it is possible to determine whether or not the infrared detection spot 72 should be classified into the ON state by a target other than a person such as the puddle 83 based on magnitude of the occupancy degree in this manner. Note that although the puddle 83 is taken as an example in FIG. 15, for example, the difference pixels are intermittently scattered even in a place where snow, water vapor, or the like is present.

In step S212, the change unit 111 changes the classification of the corresponding image detection spot 74 and the infrared detection spot 72 at a position overlapping with the image detection spot 74 to the OFF state in step S211.

In step S213, the change unit 111 determines whether there is the image detection spot 74 in which the occupancy degree of the difference pixels in an adjacent image detection spot is equal to or greater than the occupancy threshold. Here, the adjacent image detection spot is the image detection spot 74 adjacent to the image detection spot 74 in which the number of difference pixels are equal to or larger than the number of reference pixels and the occupancy degree is smaller than the occupancy threshold. In a case where there is no corresponding image detection spot 74 (N in step S213), the classification appropriateness determination process S202 ends. In a case where there is the corresponding image detection spot 74 (Y in step S213), the classification appropriateness determination process S202 proceeds to step S214.

In step S214, the change unit 111 changes the classification of the corresponding image detection spot 74 and the infrared detection spot 72 at the position overlapping with the image detection spot 74 to the ON state in step S213.

After step S214, the classification appropriateness determination process S202 ends.

Returning to FIG. 12, in step S203, the change unit 111 changes the detection determination results of the infrared sensor 31A and the image sensor 31B based on the classification of the detection spots after the classification appropriateness determination process in step S202. Similarly to steps S13 and S14 and steps S23 and S24, the detection determination of the infrared sensor 31A and the image sensor 31B is performed again based on the infrared detection spot 72 and the image detection spot 74 classified as the ON state, and when the detection is different from that acquired in step S201, the result is changed to the result of the detection determination again.

In step S204, the determiner 105 determines whether one of the infrared sensor 31A and the image sensor 31B is in the ON state. If none of them is in a detection state (N in step S204), the process S200 ends. Therefore, in a case where it is determined that a person or an object is detected by a target other than a person or an object such as the puddle 83, the detection determination result can be changed to a non-detection state. Accordingly, an activation signal to be described later is not generated, and the opening operation of the movable door 11 is not performed. As a result, the wasteful opening of the automatic door 200 is suppressed. In a case where any one of them is in the detection state (Y in step S204), the process S200 proceeds to step S205.

In step S205, the determiner 105 transmits the activation signal for activating the automatic door 100 to the control unit 106 based on the detection determination result of the detection state.

In step S206, the control unit 106 controls the door engine 40 to open the movable door 11 in response to the activation signal. Accordingly, this allows a passerby to pass through the automatic door 100. After step S206, the process S200 ends.

Hereinafter, functions and effects of the present embodiment will be described.

In the present embodiment, the detection determination result of the person or the object by the infrared sensor 31A is changed based on the image data using the image sensor 31B in addition to the infrared sensor 31A. According to the present configuration, since the detection determination result of the infrared sensor 31A can be changed based on the image data, it is possible to reliably determine whether a person or an object has been detected as compared with the case of using the infrared sensor 31A alone.

In the present embodiment, the change unit 111 changes the classification of the infrared detection spot 72 to the ON state when the occupancy degree of the difference pixels is equal to or greater than the occupancy threshold for the image detection spot 74 at the position overlapping with the infrared detection spot 72, and changes the detection determination result of the infrared sensor 31A based on the infrared detection spot 72 classified to the ON state after the change. According to this configuration, it is possible to suppress a situation where a person or an object is not detected by the infrared sensor 31A and the automatic door 100 is not opened.

In the present embodiment, the change unit 111 changes the classification of the infrared detection spot 72 and the image detection spot 74 to the OFF state when the number of difference pixels is equal to or larger than the number of reference pixels and the occupancy degree is smaller than the occupancy threshold with respect to the image detection spot 74 at the position overlapping with the infrared detection spot 72, changes the detection determination result of the infrared sensor 31A based on the infrared detection spot 72 classified as the ON state after the change, and changes the detection determination result of the image sensor 31B based on the image detection spot 74 classified as the ON state. According to this configuration, for example, it is possible to accurately determine a portion where the difference pixels such as the puddle 83 are intermittently scattered, and thus, it is possible to suppress the wasteful opening.

The present invention has been described above based on the embodiments. It is to be understood by those skilled in the art that the embodiments are examples, various modifications can be made to combinations of the respective components and the respective processing processes, and such modifications are also within the scope of the present invention.

Hereinafter, the modifications will be described.

In the embodiment, the entire infrared detection area 71 is superimposed on a part of the image detection area 73, but the present invention is not limited thereto. The infrared detection area 71 may be set such that a part of the infrared detection area 71 overlaps with a part of the image detection area 73. The infrared detection area 71 and the image detection area 73 may be set in the same area, or the image detection area 73 may be larger than the infrared detection area 71. At least a part of the image detection area 73 may overlap with the infrared detection area 71.

In the embodiment, the infrared detection area 71 is divided into the plurality of infrared detection spots 72, the image detection area 73 is divided into the plurality of image detection spots 74, and a necessity of change is determined for each infrared detection spot 72, but the present invention is not limited thereto. The necessity of change may be determined in the entire portion where the infrared detection area 71 and the image detection area 73 overlap. In this case, it may be determined whether a person or an object is detected based on whether or not a difference between the light reception amount due to the overlapping portion and the reference light reception amount exceeds the light reception amount threshold without classifying the states of the overlapping portion (steps S12, S14, S22, and S24 described above).

Figure 16:
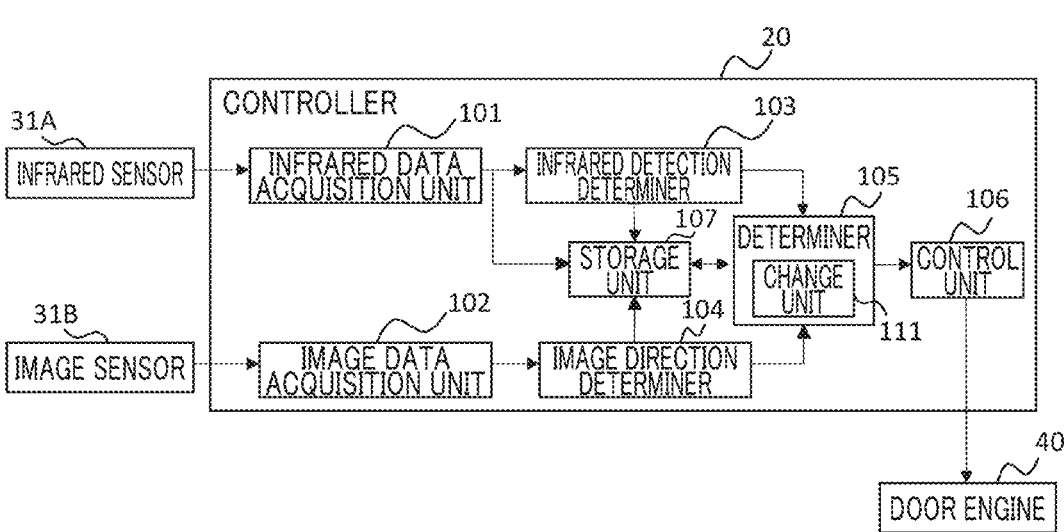
FIG. 16 is a functional block diagram of an automatic door according to a modification.

In the embodiment, the detection determination as to whether the infrared sensor 31A and the image sensor 31B detect a person or an object is made, but the present invention is not limited thereto, and the detection determination as to whether the controller 20 detects a person or an object may be made. In this case, as illustrated in FIG. 16, the infrared detection determiner 103 that determines whether a person or an object has been detected based on the infrared data and the image detection determiner 104 that determines whether a person or an object has been detected based on the image data may be provided. For example, it is assumed that the infrared data includes the light reception amount of the infrared detection area 71 and the classification result of the ON state or the OFF state for each infrared detection spot 72, and the infrared detection determiner 103 may determine whether or not a person or an object is detected by executing the processing of steps S13 to S14. The infrared data may include only the light reception amount of the infrared detection area 71, and the infrared detection determiner 103 may execute the above step S12 to classify the ON state or the OFF state of each infrared detection spot 72. Similarly, for example, it is assumed that the image data includes the luminance value of each pixel of each image detection spot 74 and the classification result of the ON state or the OFF state for each image detection spot 74, and the image detection determiner 104 may determine whether or not a person or an object is detected by executing the processing in steps S23 to S24. The image data may include only the luminance value of each pixel of each image detection spot 74, and the image detection determiner 104 may execute the above step S22 to classify the ON state or the OFF state of each image detection spot 74.

In the embodiment, the infrared data includes the light reception amount, but may not include the light reception amount.

In the embodiment, the occupancy degree of the difference pixels of the image detection spot 74 is calculated by each of the image sensor 31B and the change unit 111, but the occupancy degree may be calculated by only one of them. In a case where the occupancy degree of the difference pixels of the image detection spot 74 is calculated only by the image sensor 31B, for example, the image data transmitted to the controller 20 may include the occupancy degree of the difference pixels of the image detection spot 74. In a case where the occupancy degree of the difference pixels of the image detection spot 74 is calculated only by the change unit 111, for example, the image data transmitted to the controller 20 may include the luminance value of each pixel of the image detection area 73. In this case, since it is assumed that the image sensor 31B and the controller 20 perform the detection determination based on the luminance value and the like by different methods, the change unit 111 may change the detection determination result of the image sensor 31B. Therefore, it can be said that the change unit 111 changes at least one of the detection determination result of the infrared sensor 31A and the detection determination result of the image sensor 31B based on the image data.

In the embodiment, whether to change the classification and the detection determination result of the image detection spot 74 is determined based on the comparison between the occupancy degree and the occupancy threshold, but the present invention is not limited thereto. For example, the image detection spot 74 may be classified into the OFF state or the infrared detection spot 72 and the image detection spot 74 may be changed from the ON state to the OFF state based on a fact that the edge by the difference pixels is not detected. As described above, in a case where a person or an object is present, the difference pixels are continuously arranged, and thus an edge that is a boundary between the difference pixels and a background image is detected (for example, see FIG. 14). On the other hand, in a portion such as the puddle 83, for example, the difference pixels are intermittently scattered (see FIG. 15, for example), and thus, a boundary between the difference pixels and the background image is not clear, and thus, the edge is not often detected. Therefore, it is possible to accurately determine a portion such as the puddle 83, for example, according to the presence or absence of edge detection. Therefore, when no edge is detected, the image detection spot 74 is classified into the OFF state, or the infrared detection spot 72 and the image detection spot 74 are changed from the ON state to the OFF state, whereby the wasteful opening can be suppressed. Note that a known method may be used as a method of detecting the edge of the difference pixels.

Figure 17:
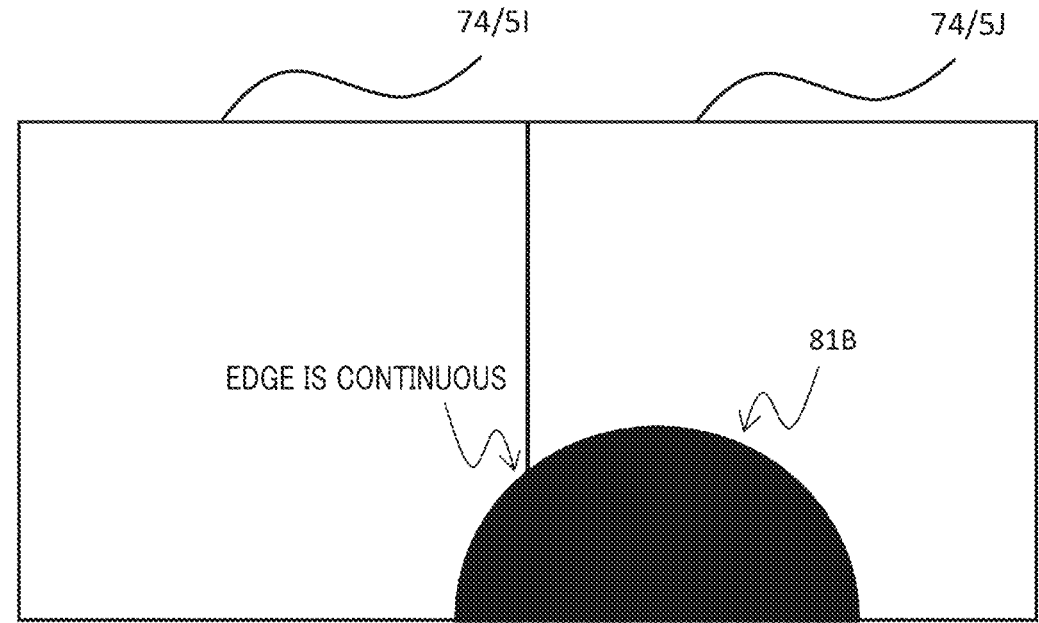
FIG. 17 is a diagram illustrating an example of difference pixels in an image detection spot.

The change unit 111 may change the classification of the infrared detection spot 72 from the OFF state to the ON state in a case where the edge by the difference pixels is continuous from the image detection spot 74 at the position overlapping with the infrared detection spot 72 to the image detection spot 74 at the overlapping position. Reference is made to FIG. 17. FIG. 17 illustrates the difference pixels in the image detection spot 74 at the addresses 5I and 5J where the head of person 81B is present. For example, in many cases, the total area and the number of spots of the difference pixels of the image detection spot 74 of the address 5I in which the head of the person 81B appears only in a corner portion are small, and the occupancy degree of the image detection spot 74 of the address 5I may be equal to or less than the occupancy threshold. In this case, in the example of the above-described embodiment, the infrared detection spot 72 in the OFF state corresponding to the image detection spot 74 at the address 5I is not changed to the ON state and remains in the OFF state although the infrared detection spot 72 is originally to be in the ON state due to the presence of the person 81B. On the other hand, even in a case where the occupancy degree is equal to or less than the occupancy threshold as in the image detection spot 74 at the address 5I, when the edge is continuous from the image detection spot 74 at the adjacent address 5J, there is a high possibility that a person or an object is present. Therefore, in a case where the edge is continuous from the adjacent image detection spot 74 in this manner, the classification of the infrared detection spot 72 is changed from the OFF state to the ON state. According to this configuration, since it is suppressed that the infrared detection spot 72 is erroneously determined to be in the OFF state, smooth passing by of a person or an object is promoted.

Figure 18:
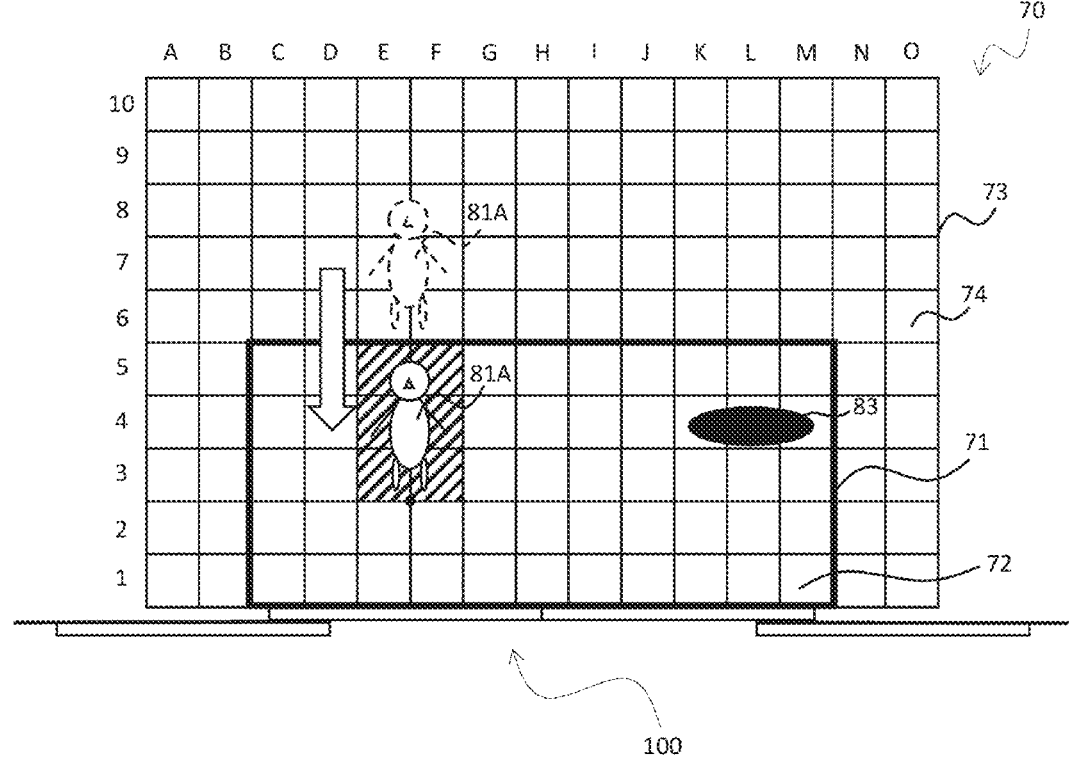
FIG. 18 is a diagram schematically illustrating an example in which a person moves from a time point before being classified into an ON state in a detection area.

The change unit 111 may calculate a difference in luminance value for the image detection spot 74 at a time point before the infrared detection spot 72 classified into the ON state is turned on around the image detection spot 74 classified into the ON state based on the image data obtained at a time point before the infrared detection spot 72 classified into the ON state is turned on, and determine whether or not to change the detection determination result based on the difference in luminance value. Here, the "image detection spot 74 around the infrared detection spot 72 in the ON state" may be the image detection spot 74 adjacent to the infrared detection spot 72 in the ON state or may be the image detection spot 74 within a range of a predetermined number of spots from the infrared detection spot 72 in the ON state. Reference is made to FIG. 18. In a case where the person 81A is actually present at the infrared detection spot 72 in the ON state, it is considered that the person 81A is present around the person before the infrared detection spot 72 is turned on and the person moves from a location to the current location. For example, the person 81A is considered to have moved to the current location from a position (the addresses 6E to 8F) farther away from the automatic door 100 than the current location (the addresses 3E to 5F). Therefore, at the time point before the ON state, the difference in luminance value remarkably appears in the image detection spots 74 of the addresses 6E to 8F around the current addresses 3E to 5F. On the other hand, in a case where the state of the infrared detection spot 72 where the puddle 83 is present is erroneously classified to the ON state, the puddle 83 does not move, and thus, it is considered that there is almost no difference in luminance value at the image detection spot 74 around the infrared detection spot 72 at the time point before the ON state. Therefore, whether or not to change the detection determination result may be determined by the occupancy degree or an edge detection method based on the difference in luminance value for the image detection spot 74 at the time point before the ON state around the infrared detection spot 72 classified as the ON state. According to this configuration, since the image data at the time point before being turned on is used, it is possible to accurately determine the infrared detection spot 72 whose state should be changed.

In the embodiment, the infrared sensor 31A and the image sensor 31B determine that a person or an object has been detected based on the classification result that the infrared detection spot 72 and the image detection spot 74 of the predetermined number of spots or more (one or more) are in the ON state, but the present invention is not limited thereto. The infrared sensor 31A and the image sensor 31B may determine that a person or an object is detected based on the classification result that the plurality of infrared detection spots 72 and the image detection spots 74 having a total area equal to or larger than a predetermined area are in the ON state.

The change unit 111 may not use the pixels that are underexposed in white or underexposed in black in the image data in the change. For example, in a case where the luminance value of each pixel in the image data is equal to or more than the white underexposure threshold value corresponding to the white underexposure, or in a case where the luminance value is equal to or less than the black underexposure threshold value corresponding to the black underexposure, the change unit 111 may not use the pixel in the determination of necessity of change in step S211 or step S213. According to the present configuration, it is possible to prevent the detection determination result from being erroneously changed due to the pixels having the white underexposure or the black underexposure in the image data.

In the embodiment, the sizes of the infrared detection spot 72 and the image detection spot 74 are equal to each other, but the present invention is not limited thereto, and the infrared detection spot 72 and the image detection spot 74 may have different sizes.

In the embodiment, the area where the infrared detection area 71 and the image detection area 73 overlap includes the plurality of infrared detection spots 72 and the plurality of image detection spots 74, but the present invention is not limited thereto. For example, the overlapping area may include at least one infrared detection spot 72 and at least one image detection spot 74 including a plurality of pixels.

In the embodiment, the light reception amount threshold has been described as an example of a detection reference, but the detection reference is not limited thereto. For example, the detection reference may be the predetermined number of spots in step S13.

In the embodiment, the difference between the luminance values is calculated, but the present invention is not limited thereto. For example, any method may be used as long as it can be determined by an image, such as calculating a difference between a YUV value and an RGB value. A color difference may be used instead of the luminance value, or at least one of the luminance value and the color difference may be used.

Although the detection determination of the person or the object can be performed more accurately by steps S14 and S24, steps S14 and S24 may not be executed.

In a case where the respective spots of the infrared detection area 71 and the image detection area 73 are classified into any of the ON state, the temporary ON state, and the OFF state, the change unit may determine whether the infrared detection spot 72 corresponding to the image detection spot 74 in the temporary ON state is in the ON state or the temporary ON state in step S203, and change the classification of the image detection spot 74 in the temporary ON state to the ON state in a case where the corresponding infrared detection spot 72 is in the ON state or the temporary ON state.

Fourth Embodiment

Hereinafter, a fourth embodiment of the present invention will be described. In the drawings and description of the fourth embodiment and the fifth embodiment to be described later, the same or equivalent components and members as those of the third embodiment are denoted by the same reference numerals. The description overlapping with the third embodiment will be omitted as appropriate, and a configuration different from the third embodiment will be mainly described.

In the third embodiment, the controller 20 determines whether to change the detection determination result, but the present invention is not limited thereto. In the fourth embodiment, it is determined whether the door sensor 30 changes the detection determination result.

Figure 19:
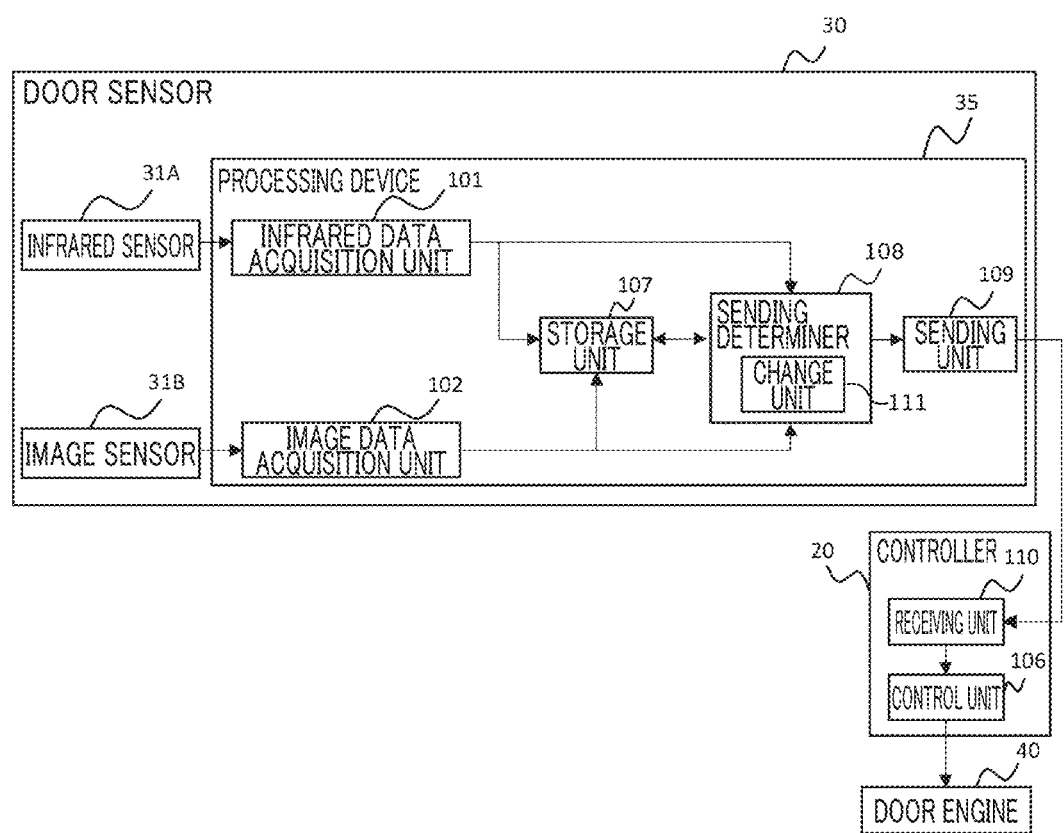
FIG. 19 is a functional block diagram of an automatic door according to a fourth embodiment.

Reference is made to FIG. 19. The door sensor 30 of the fourth embodiment includes the infrared sensor 31A, the image sensor 31B, and the processing device 35. The processing device 35 includes the infrared data acquisition unit 101, the image data acquisition unit 102, the storage unit 107, the sending determiner 108, and the sending unit 109. The controller 20 includes the control unit 106 and the receiving unit 110. The door sensor 30 of the present embodiment is an example of an automatic door sensor.

The sending determiner 108 determines whether or not to transmit, to the controller 20, a detection signal indicating that a person or an object has been detected based on the infrared data and the image data for an area in which the infrared detection area 71 and the image detection area 73 overlap. The detection signal of the present embodiment is an example of an opening operation signal for causing the movable door 11 to perform the opening operation. The sending determiner 108 includes the change unit 111. The sending unit 109 transmits the detection signal to the controller 20.

Figure 20:
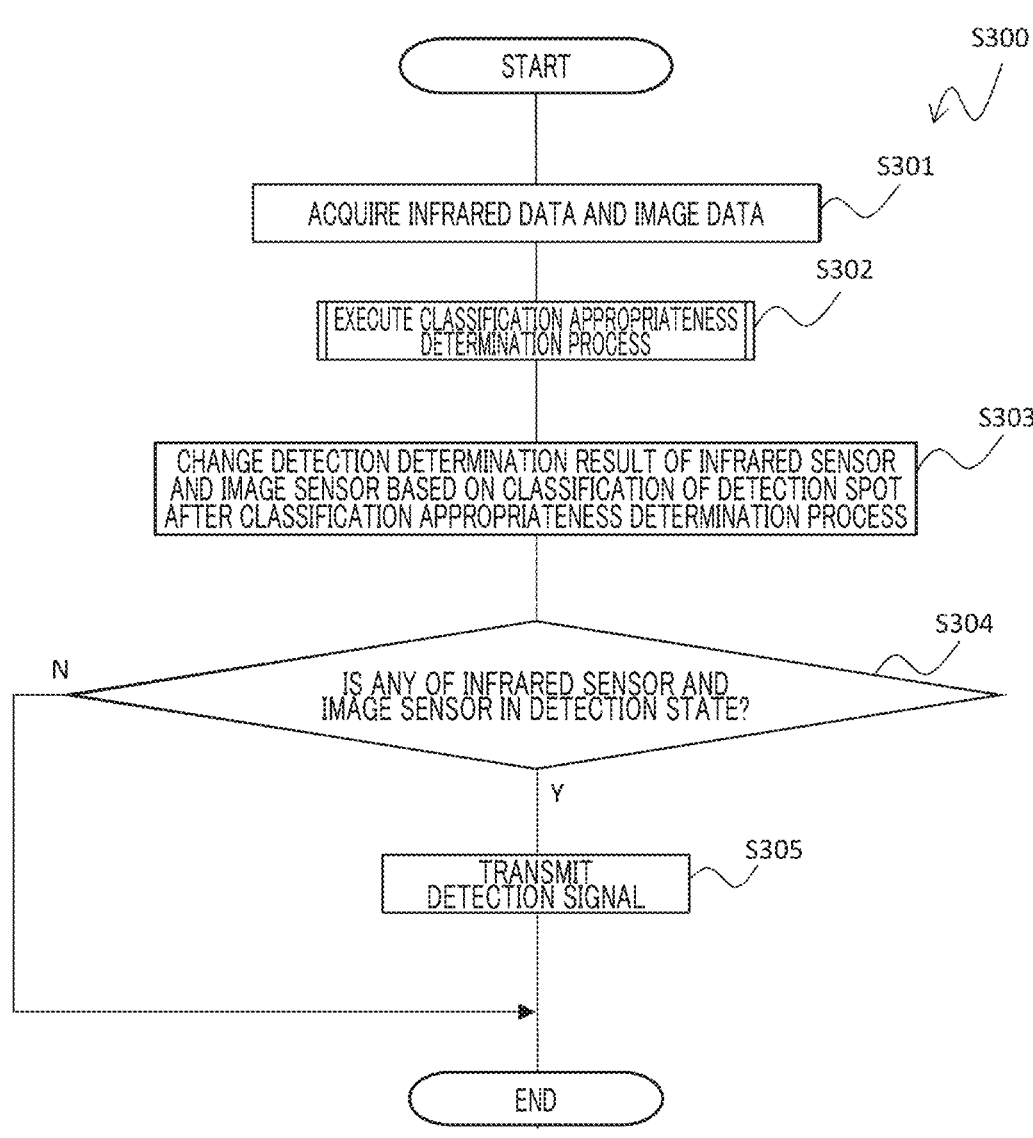
FIG. 20 is a flowchart of processing of the automatic door according to the fourth embodiment.

A process S300 according to the third embodiment will be described with reference to FIG. 20. Steps S301 to S304 of the process S300 are similar to steps S201 to S204 of the process S200 except for points particularly mentioned, and thus description thereof is omitted.

After steps S301 to S303, when it is determined in step S304 that either the infrared sensor 31A or the image sensor 31B is in the detection state, the sending determiner 108 determines to transmit the detection signal to the controller 20. Next, in step S305, the sending unit 109 transmits the detection signal to the controller 20 based on the determination result of transmission by the sending determiner 108. Thereafter, the process S300 ends.

The receiving unit 110 receives the detection signal transmitted from the sending unit 109 and supplies the detection signal to the control unit 106. In response to the detection signal, the control unit 106 controls the door engine 40 to open the movable door 11.

Fifth Embodiment

Hereinafter, a fifth embodiment of the present invention will be described.

The change unit 111 of the third embodiment changes the detection determination result of the infrared sensor 31A, but the change unit 111 of the fifth embodiment changes the detection reference for the detection determination by the infrared sensor 31A.

Figure 21:
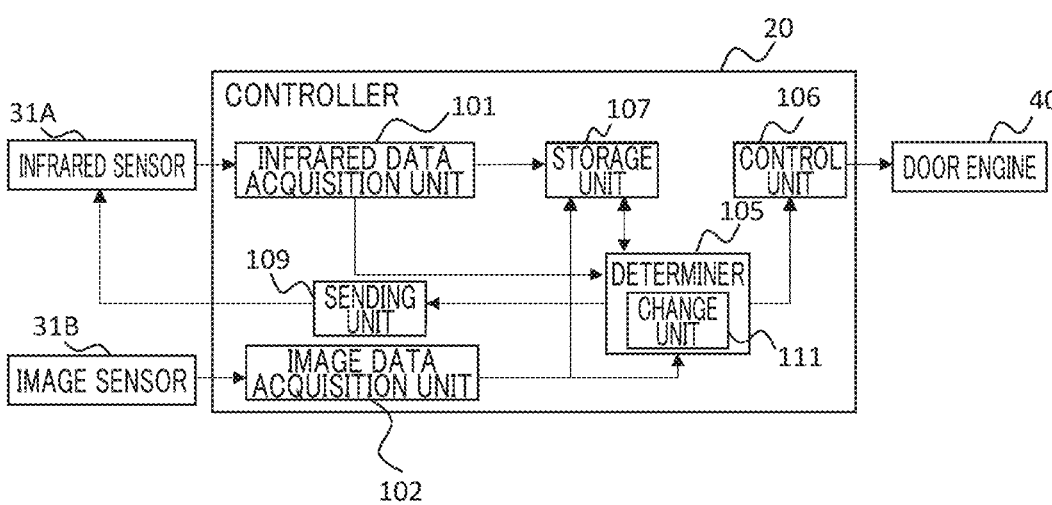
FIG. 21 is a functional block diagram of an automatic door according to a fifth embodiment.

Reference is made to FIG. 21. The controller 20 of the fifth embodiment includes the sending unit 109. The sending unit 109 of the fifth embodiment transmits the detection reference changed by the change unit 111 to the infrared sensor 31A. The storage unit 107 of the present embodiment stores a reference light reception amount for each infrared detection spot 72 as a detection reference.

Figure 22:
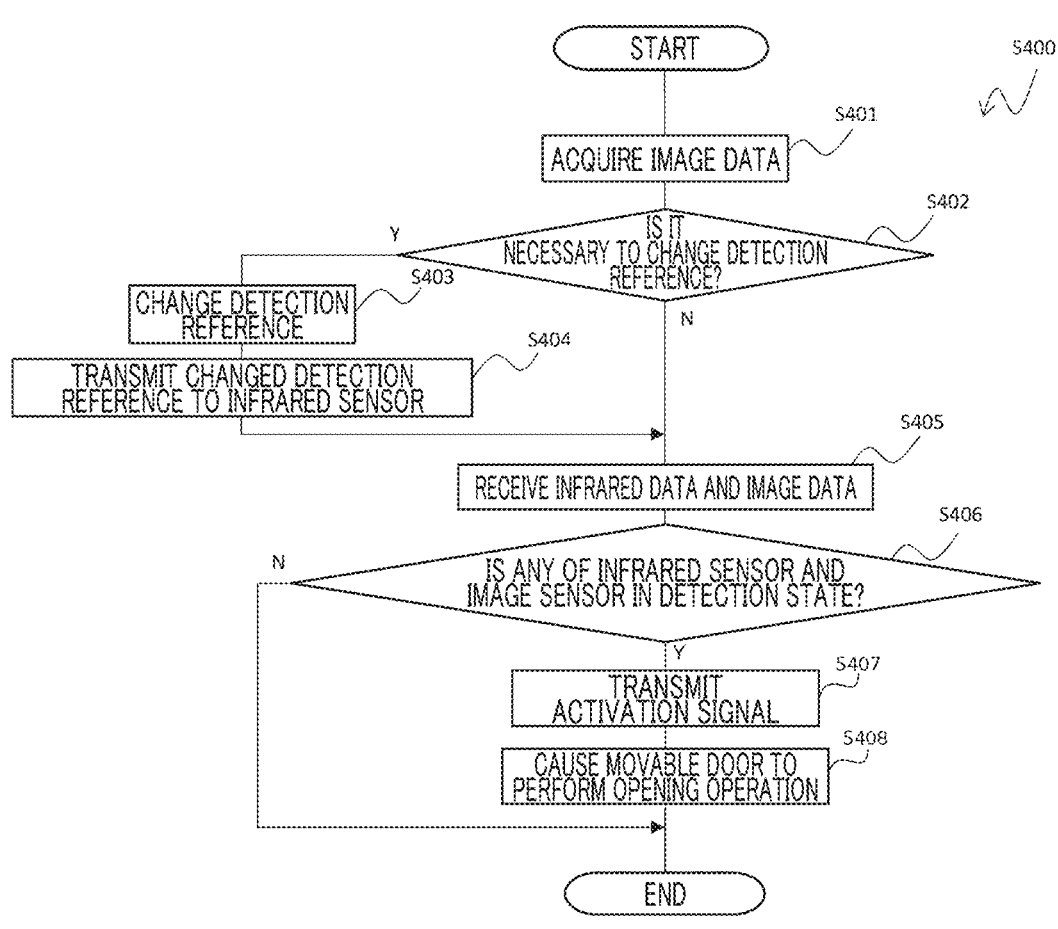
FIG. 22 is a flowchart of processing of the automatic door according to the fifth embodiment.

The processing of the controller 20 according to the fifth embodiment will be described with reference to FIG. 22. FIG. 22 is the flowchart illustrating a process S400 in the controller 20 according to the fifth embodiment. The process S400 is executed at predetermined time intervals.

In step S401, the image data acquisition unit 102 acquires the image data. The image data acquisition unit 102 supplies the acquired image data to the change unit 111.

In step S402, the change unit 111 determines whether or not it is necessary to change the detection reference based on the image data. For example, the change unit 111 calculates the difference in luminance value between each pixel of the image data of each of the image detection spots 74 and each pixel of the reference image. The change unit 111 compares the difference calculated for each pixel with the luminance threshold, obtains the difference pixels, and calculates the occupancy degree for each image detection spot 74. In a case where the occupancy degree is larger than a predetermined occupancy threshold, the change unit 111 determines that it is necessary to change the detection reference. In a case where the occupancy degree is equal to or less than the predetermined occupancy threshold, the change unit 111 determines that it is not necessary to change the detection reference.

In a case where it is necessary to change the detection reference (Y in step S402), the process S400 proceeds to step S403. In a case where it is not necessary to change the detection reference (N in step S402), the process S400 proceeds to step S405.

In step S403, the change unit 111 changes the detection reference. For example, the change unit 111 changes the light reception amount threshold in the infrared sensor 31A to be small. The light reception amount threshold of the present embodiment is an example of the detection reference. The change unit 111 may change the detection reference downward by a predetermined value or may change the detection reference downward based on a deviation degree between the occupancy degree and the occupancy threshold. The change unit 111 supplies the changed detection reference to the sending unit 109.

In step S404, the sending unit 109 transmits the changed detection reference to the infrared sensor 31A. Accordingly, the infrared sensor 31A is caused to determine whether a person or an object is detected using the changed detection reference.

In step S405, the infrared data acquisition unit 101 and the image data acquisition unit 102 acquire the infrared data and the image data, respectively. The infrared data includes the detection determination result based on the changed detection reference. Here, in a case where the detection reference is changed downward in step S403, the difference between the light reception amount at each infrared detection spot 72 and the reference light reception amount easily exceeds the light reception amount threshold, so that the infrared detection spot 72 is easily classified into the ON state. As a result, the detection state is easily determined by the infrared sensor 31A. The infrared data acquisition unit 101 and the image data acquisition unit 102 supply the acquired infrared data and image data to the determiner 105.

Since steps S406 to S408 are similar to steps S204 to S206 described above, the description thereof will be omitted. After step S408, the process S400 ends.

In the fifth embodiment, the detection reference is changed downward in a case where the occupancy degree is equal to or less than the occupancy threshold, but the present invention is not limited thereto. For example, the detection reference may be changed upward in a case where the occupancy degree exceeds the occupancy threshold.

In the fifth embodiment, the light reception amount threshold is changed as the detection reference, but the present invention is not limited thereto. For example, the predetermined number of spots in step S13 may be changed.

In the fifth embodiment, the sending unit 109 transmits the changed detection reference to the infrared sensor 31A, but the present invention is not limited thereto. For example, the sending unit 109 may transmit, to the infrared sensor 31A, a change command for increasing or decreasing the detection reference by a predetermined value.

In the third and fifth embodiments, one of the detection reference and the detection determination result of the infrared sensor 31A is changed, but the present invention is not limited thereto, and both the detection reference and the detection determination result of the infrared sensor 31A may be changed.

In the third and fifth embodiments, the infrared sensor 31A, the image sensor 31B, and the change unit 111 classify each spot of the infrared detection area 71 and the image detection area 73 into either the ON state or the OFF state. However, the temporary ON state for suspending determination as to whether a person or an object is present in the spot may be provided. For example, in a case where there is a human shadow in the image detection area 73, the image data of the corresponding image detection spot 74 differs from the reference image depending on the presence or absence of the human shadow. However, since the human shadow does not appear clearly in the image data as compared with the case where there is actually a person, the difference in luminance value between each pixel and each pixel of the reference image does not reach the luminance threshold in the human shadow portion. As a result, these corresponding image detection spots 74 are classified into the temporary ON state. In a case where the puddle 83 is present in the infrared detection area 71, the light reception amount of the corresponding infrared detection spot 72 varies from the reference light reception amount of the infrared detection spot 72 but is smaller than the light reception amount when a person is detected. As a result, the infrared detection spot 72 is classified into the temporary ON state.

Among the embodiments disclosed in the present description, those in which a plurality of functions is provided in a distributed manner may be provided by aggregating some or all of the plurality of functions, and conversely, those in which a plurality of functions is provided in an aggregated manner may be provided so that some or all of the plurality of functions are distributed. The present invention may be structured to achieve the object of the invention regardless of whether the functions are aggregated or distributed.

The invention claimed is:

1. An automatic door device comprising:
    an infrared sensor including an infrared detection area around a door provided in an opening and that detects a person or an object in the infrared detection area;
    an image sensor including an image detection area around the door and that detects a person or an object in the image detection area;
    an infrared detection determiner that determines whether the infrared sensor detects a person or an object;
    an image detection determiner that determines whether the image sensor detects a person or an object;
    a determiner that determines whether or not to perform an opening operation of the door based on respective determination results of the infrared detection determiner and the image detection determiner; and
    a control unit that performs the opening operation of the door based on a determination result indicating that the opening operation is to be performed, wherein
    the image detection determiner classifies a state of the image detection area, based on image data obtained from the image sensor, into any of an ON state in which it is determined that a person or an object is present in the detection area, a temporary ON state for suspending determination as to whether a person or an object is present in the detection area, and an OFF state in which it is determined that a person or an object is not present in the detection area,
    the infrared detection determiner classifies a state of the infrared detection area into any of the ON state, the temporary ON state, and the OFF state based on infrared data obtained from the infrared sensor,
    the image detection area is divided into a plurality of image detection spots,
    the infrared detection area is divided into a plurality of infrared detection spots,
    the infrared detection area and the image detection area at least partially overlap,
    the image detection determiner classifies a state of each of the plurality of image detection spots into any of the ON state, the temporary ON state, and the OFF state,
    the infrared detection determiner classifies a state of each of the plurality of infrared detection spots into any of the ON state, the temporary ON state, and the OFF state,
    in a case where both the infrared detection spot and the image detection spot at positions overlapping with each other are in the temporary ON state, the determiner regards at least one of the infrared detection spot and the image detection spot in the temporary ON state as the ON state, and
    the determiner determines to perform the opening operation of the door in at least one of a case where one of the infrared detection spot and the image detection spot is classified into the ON state and a motion vector of the detection spot in the ON state is moving toward the opening, and a case where the other of the infrared detection spot and the image detection spot at a position overlapping with the detection spot in the temporary ON state is classified into the temporary ON state in a case where one of the infrared detection spot and the image detection spot is classified into the temporary ON state and a motion vector of the detection spot in the temporary ON state is moving toward the opening.

2. The automatic door device according to claim 1, wherein
the determiner determines to perform the opening operation based on a determination result that the person or the object is detected by at least one of the infrared detection determiner and the image detection determiner.

3. The automatic door device according to claim 1, wherein
the image detection determiner obtains, for each of the image detection spots, the number of pixels in which a difference between at least one of a luminance value and a color difference between the image data of the image detection spot and a reference image of the image detection spot is a predetermined threshold or more, and
the image detection determiner classifies the state of the image detection spot into the ON state in a case where the number of pixels is larger than a first pixel number threshold, classifies the state into the OFF state in a case where the number of pixels is smaller than a second pixel number threshold smaller than the first pixel number threshold, and classifies the state into the temporary ON state in a case where the number of pixels is equal to or larger than the second pixel number threshold and equal to or smaller than the first pixel number threshold.

4. The automatic door device according to claim 1, wherein
the infrared detection determiner obtains a difference between a light reception amount of the light reflected by the infrared detection spot and received by the infrared sensor for each infrared detection spot and a reference value of the light reception amount determined for each infrared detection spot, and
the infrared detection determiner classifies the state of the infrared detection spot into the ON state in a case where the difference is larger than a first light reception amount threshold, classifies the state into the OFF state in a case where the difference is smaller than a second light reception amount threshold smaller than the first light reception amount threshold, and classifies the state into the temporary ON state in a case where the difference is equal to or larger than the second light reception amount threshold and equal to or smaller than the first light reception amount threshold.

5. The automatic door device according to claim 1, wherein
the infrared detection determiner determines that the person or the object is detected based on a fact that the number of the infrared detection spots in the ON state is equal to or larger than a predetermined number or a total area of the infrared detection spots in the ON state is equal to or larger than a predetermined total area.

6. The automatic door device according to claim 1, wherein
the image detection area is larger than the infrared detection area, and the determiner determines whether or not to perform the opening operation based on a determination result of the image detection determiner in an area outside the infrared detection area and inside the image detection area.

7. The automatic door device according to claim 1, wherein
the infrared detection area has an area outside the image detection area, and
the determiner determines whether or not to perform the opening operation based on a result of the infrared detection determiner in an area outside the image detection area in the infrared detection area.

8. An automatic door device comprising:
an infrared sensor including an infrared detection area around a door provided in an opening and that detects a person or an object in the infrared detection area;
an image sensor including an image detection area around the door and that detects a person or an object in the image detection area;
an infrared detection determiner that determines whether the infrared sensor detects a person or an object;
an image detection determiner that determines whether the image sensor detects a person or an object;
a determiner that determines whether or not to perform an opening operation of the door based on respective determination results of the infrared detection determiner and the image detection determiner;
a control unit that performs the opening operation of the door based on a determination result indicating that the opening operation is to be performed, and
a change unit that changes at least one of a determination result of the infrared detection determiner and a determination result of the image detection determiner based on image data obtained from the image sensor for an area in which the infrared detection area and the image detection area overlap, wherein
the determiner determines whether or not to perform the opening operation of the door based on the changed at least determination result.

9. The automatic door device according to claim 8, wherein
the change unit changes a detection determination result of the infrared sensor to a detection state when an occupancy degree indicating a degree occupied in the overlapping area by a pixel having a difference of at least one of a luminance value and a color difference between each pixel of the image data of the overlapping area and each pixel of a reference image of the overlapping area, the difference being larger than a threshold, is equal to or larger than an occupancy threshold.

10. The automatic door device according to claim 8, wherein
the change unit changes the determination result of the infrared detection determiner and the determination result of the image detection determiner to a non-detection state when a pixel, having a difference of at least one of a luminance value and a color difference between each pixel of the image data of the overlapping area and each pixel of a reference image of the overlapping area, the difference being larger than a threshold, is equal to or greater than the number of reference pixels in the overlapping area and an occupancy degree indicating a degree occupied in the overlapping area by the pixel having the difference greater than the threshold is smaller than an occupancy threshold.

11. The automatic door device according to claim 8, wherein the change unit changes a determination result of the infrared detection determiner to a detection state when an edge, is detected, in which a pixel, having a difference of at least one of a luminance value and a color difference between each pixel of the image data of the overlapping area and each pixel of a reference image of the overlapping area, the difference being greater than a threshold, is continuously formed.

12. The automatic door device according to claim 8, wherein the change unit changes a determination result of the infrared detection determiner and a determination result of the image detection determiner to a non-detection state when an edge, is not detected, in which a pixel, having a difference of at least one of a luminance value and a color difference between each pixel of the image data of the overlapping area and each pixel of a reference image of the overlapping area, the difference being greater than a threshold, is continuously formed.

13. The automatic door device according to claim 8, wherein the infrared detection area is divided into a plurality of infrared detection spots, the image detection area is divided into a plurality of image detection spots, each of the infrared detection spots is classified into one of an ON state in which it is determined that a person or an object is detected based on the infrared data and an OFF state in which it is determined that a person or an object is not detected, and the change unit changes the classification of the infrared detection spot to an ON state when, for the image detection spot at a position overlapping with the infrared detection spot, an occupancy degree indicating a degree occupied in the image detection spot at the overlapping position by a pixel having a difference of at least one of a luminance value and a color difference between each pixel of the image data in the overlapping area and each pixel of a reference image in the overlapping area, the difference being larger than a threshold, is equal to or larger than an occupancy threshold, and changes a determination result of the infrared detection determiner based on the infrared detection spot classified as the ON state.

14. The automatic door device according to claim 8, wherein the infrared detection area is divided into a plurality of infrared detection spots, the image detection area is divided into a plurality of image detection spots, each of the infrared detection spots is classified into at least one of an ON state in which it is determined that a person or an object is detected based on the infrared data and an OFF state in which it is determined that no person or object is detected, each of the image detection spots is classified into at least one of the ON state and the OFF state based on the image data, and the change unit changes the classification of the infrared detection spot and the image detection spot to an OFF state when, for the image detection spot at a position overlapping with the infrared detection spot, the number of pixels having a difference of at least one of a luminance value and a color difference between each pixel of the image data in the overlapping area and each pixel of a reference image in the overlapping area, the difference being larger than a threshold value, is equal to or larger than the number of reference pixels, and an occupancy degree indicating a degree occupied in the overlapping area by a pixel having the difference larger than the threshold is smaller than an occupancy threshold, and changes a determination result of the infrared detection determiner based on the infrared detection spot classified as the ON state, and changing a determination result of the image detection determiner based on the image detection spot classified as the ON state.

15. The automatic door device according to claim 8, wherein the infrared detection area is divided into a plurality of infrared detection spots, the image detection area is divided into a plurality of image detection spots, each of the infrared detection spots is classified into one of an ON state in which it is determined that a person or an object is detected based on the infrared data and an OFF state in which it is determined that a person or an object is not detected, and the change unit changes the classification of the infrared detection spot to an ON state when an edge, is detected, in which a pixel, having a difference of at least one of a luminance value and a color difference between each pixel of the image data in the overlapping area and each pixel of the reference image in the overlapping area, the difference being greater than a threshold, is continuously formed, for the image detection spot at the overlapping position and the adjacent image detection spot, and changes a determination result of the infrared detection determiner based on the infrared detection spot classified as the ON state.

16. The automatic door device according to claim 8, wherein the infrared detection area is divided into a plurality of infrared detection spots, the image detection area is divided into a plurality of image detection spots, each of the infrared detection spots is classified into one of an ON state in which it is determined that a person or an object is detected based on the infrared data and an OFF state in which it is determined that no person or object is detected, each of the image detection spots is classified into at least one of the ON state and the OFF state based on the image data, the classification of the infrared detection spot is changed to an OFF state when an edge, is not detected, in which a pixel, having a difference of at least one of a luminance value and a color difference between each pixel of the image data in the overlapping area and each pixel of a reference image in the overlapping area, the difference being greater than a threshold is continuously formed, for the image detection spot at the overlapping position and the adjacent image detection spot, and a determination result of the infrared detection determiner is changed based on the infrared detection spot classified as the ON state, and a determination result of the image detection determiner is changed based on the image detection spot classified as the ON state.

17. The automatic door device according to claim 13, wherein the change unit changes the classification of the infrared detection spot to an ON state regardless of the occupancy degree of the image detection spot at the overlapping position in a case where the occupancy degree of a pixel having a difference of at least one of a luminance value and a color difference between each pixel of the image data of the overlapping area and each pixel of the reference image of the overlapping area, the difference being larger than a threshold, is equal to or larger than the occupancy threshold for the image detection spot adjacent to the image detection spot at the overlapping position.

18. The automatic door device according to claim 13, wherein the change unit calculates, for the infrared detection spot classified as the ON state, a difference of at least one of the luminance value and the color difference for the image detection spot around the infrared detection spot at a time point before the ON state is set based on the image data obtained at a time point before the ON state is set, and determines whether or not to perform the change based on the difference.

19. The automatic door device according to claim 8, wherein the image detection area is divided into a plurality of image detection spots, the infrared detection area is divided into a plurality of infrared detection spots, and each of the infrared detection spots is classified into at least one of an ON state and an OFF state based on the infrared data, wherein the device comprises a change unit that changes a detection reference of the infrared sensor based on the image data, and the change unit changes the detection reference of the infrared detection determiner downward in a case where, for the image detection spot in which the infrared detection spot is in the OFF state and at a position overlapping with the infrared detection spot, an occupancy degree indicating a degree occupied in the image detection spot at the overlapping position by a pixel having a difference of at least one of a luminance value and a color difference between each pixel of the image data of the overlapping area and each pixel of a reference image of the overlapping area, the difference being larger than a threshold, is larger than an occupancy threshold.

20. The automatic door device according to claim 13, wherein the overlapping area includes at least one infrared detection spot and at least one image detection spot including a plurality of pixels.

21. The automatic door device according to claim 8, wherein the change unit does not use a pixel in which the image data is underexposed in white or underexposed in black in the change.

22. An automatic door sensor comprising:

an infrared sensor including an infrared detection area around a door provided in an opening and that detects a person or an object in the infrared detection area;

an image sensor including an image detection area around the door and that detects a person or an object in the image detection area;

an infrared detection determiner that determines whether the infrared sensor detects a person or an object;

an image detection determiner that determines whether the image sensor detects a person or an object; and a sending determiner that determines whether or not to transmit an opening operation signal for causing the door to perform an opening operation based on each determination result of the infrared detection determiner and the image detection determiner, wherein the image detection determiner classifies a state of the image detection area, based on image data obtained from the image sensor, into any of an ON state in which it is determined that a person or an object is present in the detection area, a temporary ON state for suspending determination as to whether a person or an object is present in the detection area, and an OFF state in which it is determined that a person or an object is not present in the detection area, the infrared detection determiner classifies a state of the infrared detection area into any of the ON state, the temporary ON state, and the OFF state based on infrared data obtained from the infrared sensor, the image detection area is divided into a plurality of image detection spots, the infrared detection area is divided into a plurality of infrared detection spots, the infrared detection area and the image detection area at least partially overlap, the image detection determiner classifies a state of each of the plurality of image detection spots into any of the ON state, the temporary ON state, and the OFF state, the infrared detection determiner classifies a state of each of the plurality of infrared detection spots into any of the ON state, the temporary ON state, and the OFF state, in a case where both the infrared detection spot and the image detection spot at positions overlapping with each other are in the temporary ON state, the determiner regards at least one of the infrared detection spot and the image detection spot in the temporary ON state as the ON state, and the sending determiner determines to transmit an opening operation signal in at least one of a case where one of the infrared detection spot and the image detection spot is classified into the ON state and a motion vector of the detection spot in the ON state is moving toward the opening, and a case where the other of the infrared detection spot and the image detection spot at a position overlapping with the detection spot in the temporary ON state is classified into the temporary ON state in a case where one of the infrared detection spot and the image detection spot is classified into the temporary ON state and a motion vector of the detection spot in the temporary ON state is moving toward the opening.

23. An automatic door sensor comprising:

an infrared sensor including an infrared detection area around a door provided in an opening and that detects a person or an object in the infrared detection area;

an image sensor including an image detection area around the door and that detects a person or an object in the image detection area;

an infrared detection determiner that determines whether the infrared sensor detects a person or an object;

an image detection determiner that determines whether the image sensor detects a person or an object;

a sending determiner that determines whether or not to transmit an opening operation signal for causing the door to perform an opening operation based on each determination result of the infrared detection determiner and the image detection determiner; and a change unit that changes at least one of a determination result of the infrared detection determiner and a determination result of the image detection determiner based on image data obtained from the image sensor for an area in which the infrared detection area and the image detection area overlap, wherein the sending determiner that determines whether or not to transmit an opening operation signal for causing the door to perform an opening operation based on the changed at least one determination result.

24. An automatic door control method comprising:

a step of acquiring infrared data from an infrared sensor including an infrared detection area around a door provided in an opening and that detects a person or an object in the infrared detection area, the infrared detection area is divided into a plurality of infrared detection spots;

a step of acquiring image data from an image sensor including an image detection area around the door and that detects a person or an object in the image detection area, the image detection area is divided into a plurality of image detection spots, the infrared detection area and the image detection area at least partially overlap;

a step of classifying a state of each of the plurality of image detection spots, based on the image data, into any of an ON state in which it is determined that a person or an object is present in the detection area, a temporary ON state for suspending determination as to whether a person or an object is present in the detection area, and an OFF state in which it is determined that a person or an object is not present in the detection area;

a step of classifying a state of each of the plurality of infrared detection spots into any of the ON state, the temporary ON state, and the OFF state based on the infrared data;

in a case where both the infrared detection spot and the image detection spot at positions overlapping with each other are in the temporary ON state, a step of regarding at least one of the infrared detection spot and the image detection spot in the temporary ON state as the ON state;

a step of determining to perform the opening operation of the door in at least one of a case where one of the infrared detection spot and the image detection spot is classified into the ON state and a motion vector of the detection spot in the ON state is moving toward the opening, and a case where the other of the infrared detection spot and the image detection spot at a position overlapping with the detection spot in the temporary ON state is classified into the temporary ON state in a case where one of the infrared detection spot and the image detection spot is classified into the temporary ON state and a motion vector of the detection spot in the temporary ON state is moving toward the opening;

a step of causing the door to perform an opening operation based on a determination result indicating that the opening operation is to be performed.

25. An automatic door control method comprising:

a step of acquiring infrared data from an infrared sensor including an infrared detection area around a door provided in an opening and that detects a person or an object in the infrared detection area;

a step of acquiring image data from an image sensor including an image detection area around the door and that detects a person or an object in the image detection area;

a step of determining whether the infrared sensor detects a person or an object based on the infrared data;

a step of determining whether the image sensor detects a person or an object based on the image data;

a step of determining whether or not to perform an opening operation of the door based on respective determination results as to whether the infrared sensor and the image sensor detect a person or an object;

a step of causing the door to perform an opening operation based on a determination result indicating that the opening operation is to be performed; and changing the determination as to whether or not to perform the opening operation of the door based on the infrared data and the image data for an area in which the infrared detection area and the image detection area overlap with each other.

* * * * *